(12) United States Patent
Sambonsugi

(10) Patent No.: US 11,736,824 B2
(45) Date of Patent: Aug. 22, 2023

(54) IMAGE CAPTURE APPARATUS AND CONTROL METHOD THEREOF

(71) Applicant: CANON KABUSHIKI KAISHA, Tokyo (JP)

(72) Inventor: Hideaki Sambonsugi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/829,819

(22) Filed: Jun. 1, 2022

(65) Prior Publication Data

US 2022/0295001 A1    Sep. 15, 2022

Related U.S. Application Data

(63) Continuation of application No. 17/253,092, filed as application No. PCT/JP2019/023547 on Jun. 13, 2019, now Pat. No. 11,381,763.

(30) Foreign Application Priority Data

Jun. 18, 2018    (JP) ................................ 2018-115424

(51) Int. Cl.
| | |
|---|---|
| *H04N 25/53* | (2023.01) |
| *H04N 25/75* | (2023.01) |
| *H04N 25/78* | (2023.01) |

(52) U.S. Cl.
CPC ............. *H04N 25/53* (2023.01); *H04N 25/75* (2023.01); *H04N 25/78* (2023.01)

(58) Field of Classification Search
CPC ........ H04N 5/353; H04N 5/378; H04N 5/232; H04N 5/232122; H04N 5/3742;
(Continued)

(56) References Cited

U.S. PATENT DOCUMENTS

| | | | |
|---|---|---|---|
| 9,894,237 B2 | 2/2018 | Negishi | |
| 11,381,763 B2* | 7/2022 | Sambonsugi | .... H04N 5/232122 |

(Continued)

FOREIGN PATENT DOCUMENTS

| | | |
|---|---|---|
| EP | 2 575 355 A2 | 4/2013 |
| JP | 2007-318725 A | 12/2007 |

(Continued)

OTHER PUBLICATIONS

The International Search Report of the corresponding International Application, PCT/JP2019/023547 dated Aug. 13, 2019.

(Continued)

*Primary Examiner* — Kelly L Jerabek
(74) *Attorney, Agent, or Firm* — Cowan, Liebowitz & Latman, P.C.

(57) ABSTRACT

An image capture apparatus that is capable of suppress the loss of moving image frames using a simple configuration when shooting a still image while shooting a moving image, is disclosed. If a still image shooting is instructed during a moving image shooting, the shooting, a timing of the still image is controlled so that a period in which still image data is read out from an image sensor does not overlap with a period in which moving image data is read out from the image sensor. In addition, after the still image data is written into the memory, the still image data is read out and output from the memory during a period in which the moving image data read out from the image sensor is not output.

4 Claims, 29 Drawing Sheets

(58) Field of Classification Search
CPC .... H04N 5/343; H04N 5/23245; H04N 25/53; H04N 25/75; H04N 25/78; H04N 25/42; H04N 25/767
See application file for complete search history.

(56) References Cited

U.S. PATENT DOCUMENTS

| | | |
|---|---|---|
| 2007/0279498 A1 | 12/2007 | Nonaka |
| 2014/0176785 A1 | 6/2014 | Sambonsugi et al. |
| 2015/0097999 A1 | 4/2015 | Sambonsugi |
| 2016/0191832 A1 | 6/2016 | Inui et al. |
| 2019/0289201 A1 | 9/2019 | Nishimura et al. |

FOREIGN PATENT DOCUMENTS

| | | | |
|---|---|---|---|
| JP | 2010-199927 | A | 9/2010 |
| JP | 2014-122957 | A | 7/2014 |

OTHER PUBLICATIONS

The Mar. 8, 2021 Japanese Office Action, which is enclosed without an English Translation, that issued in Japanese Patent Application No. 2018-115424.

\* cited by examiner

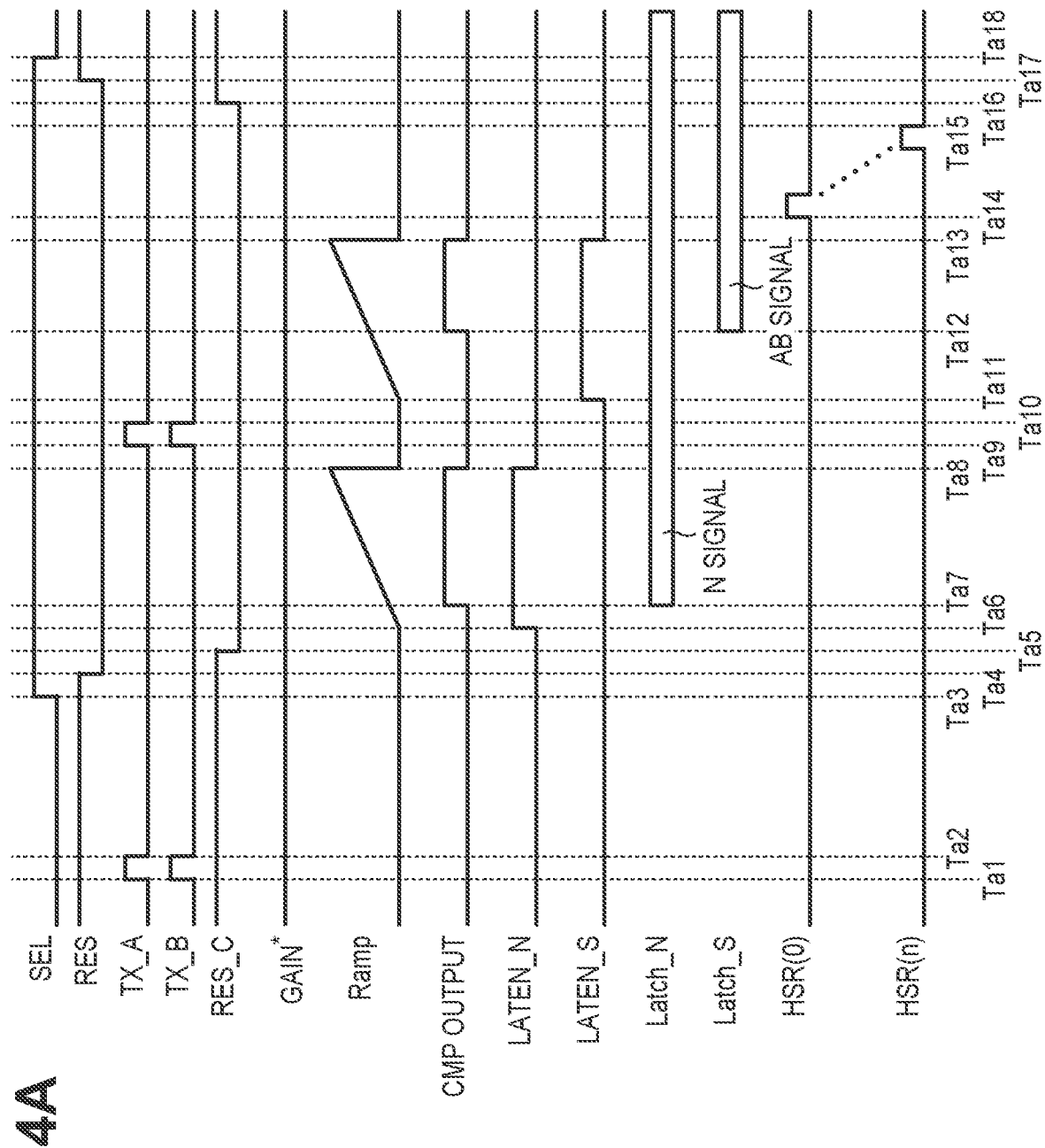

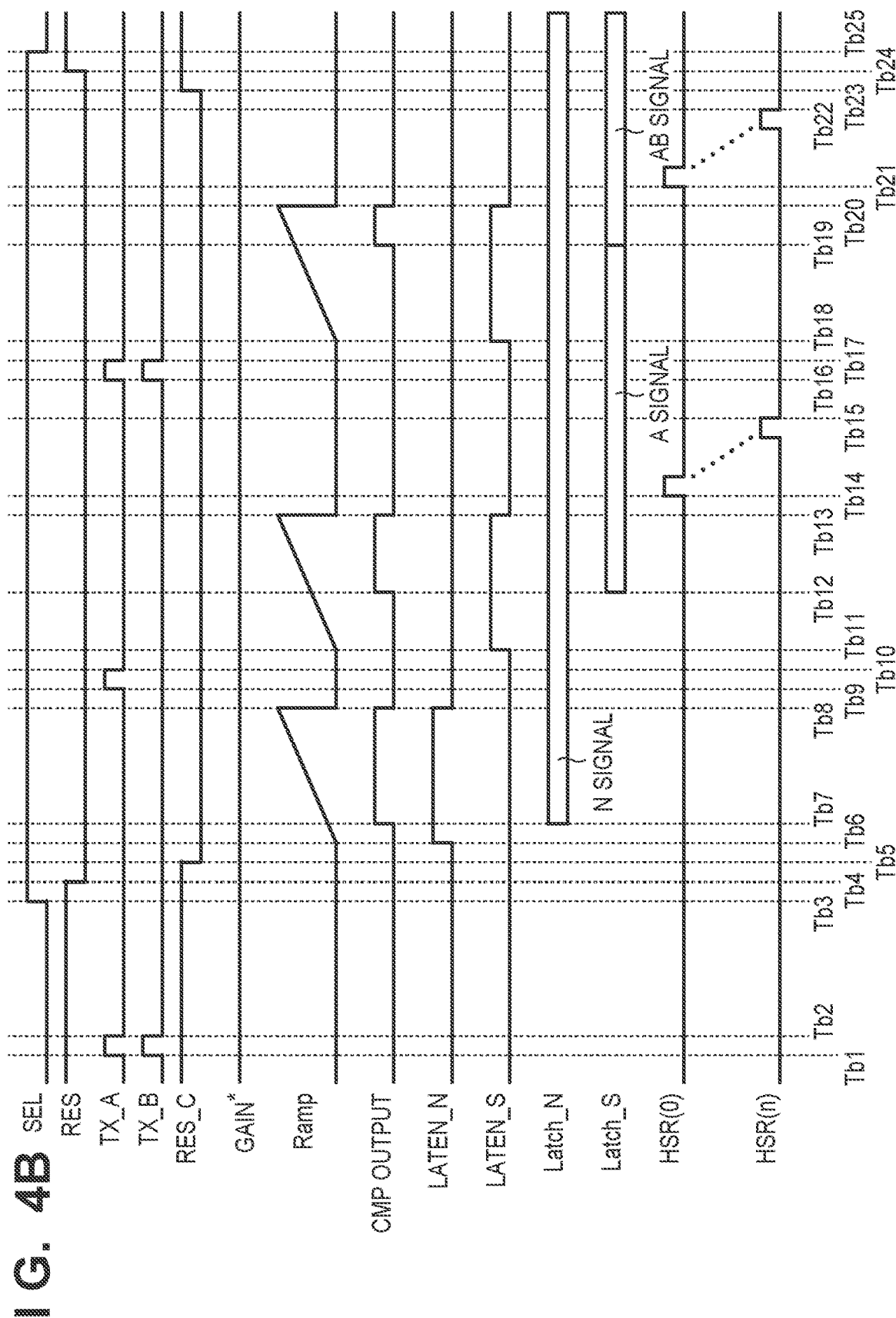

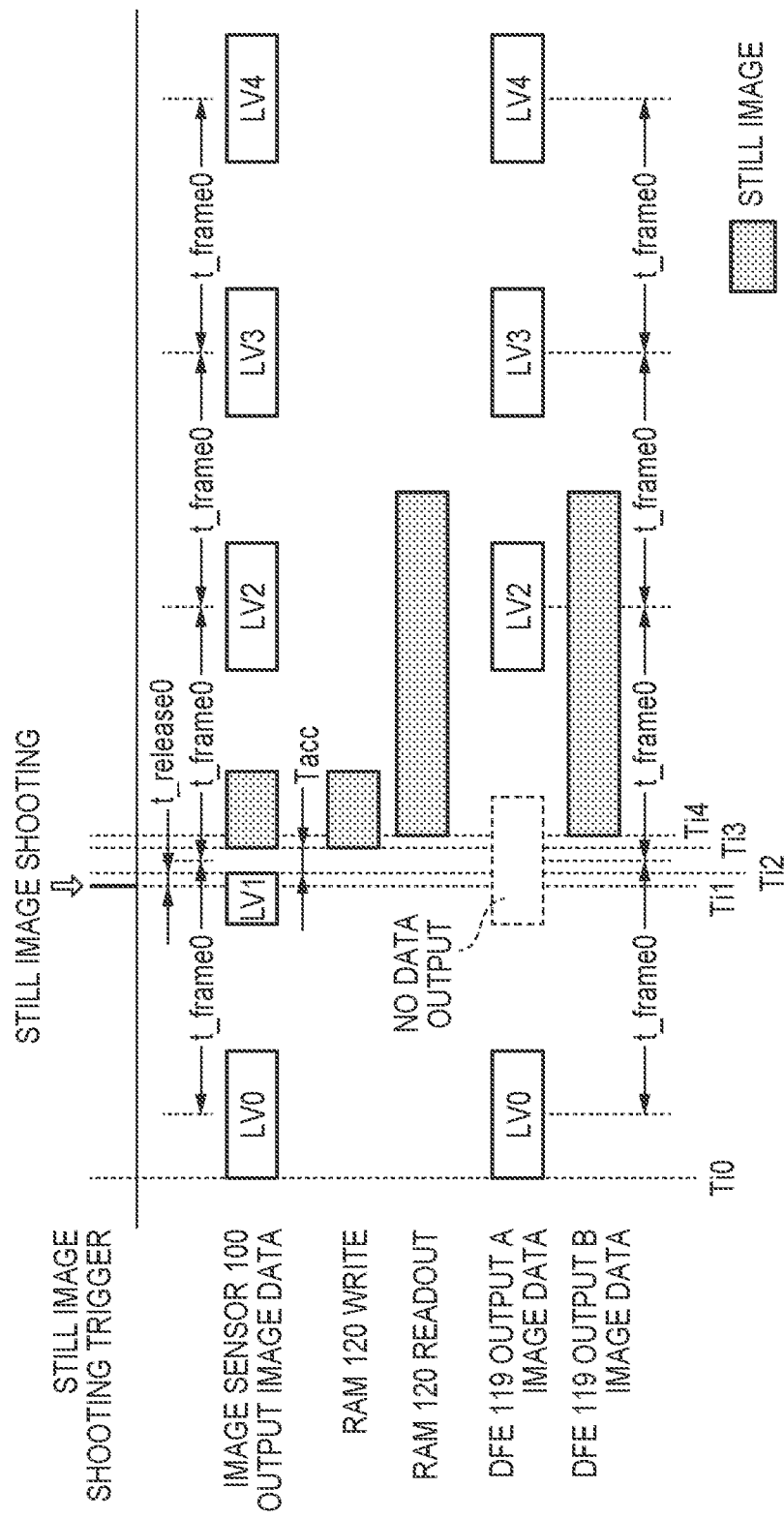

IMAGE CAPTURE APPARATUS AND CONTROL METHOD THEREOF

CROSS-REFERENCE TO RELATED APPLICATIONS

This application is a continuation of application Ser. No. 17/253,092, filed Dec. 16, 2020, the entire disclosure of which is hereby incorporated by reference, which is a national phase of International Patent Application No. PCT/JP2019/023547, filed Jun. 13, 2019, which claims the benefit of Japanese Patent Application No. 2018-115424, filed Jun. 18, 2018, all of which are hereby incorporated by reference herein in their entirety.

TECHNICAL FIELD

The present invention relates to an image capture apparatus and a control method thereof.

BACKGROUND ART

A conventional image capture apparatus is known, in which different numbers of pixels are read out from an image sensor depending on whether a still image or a moving image is being shot. In such an image capture apparatus, a still image cannot be read out from the image sensor within a single frame period of the moving image. As such, when shooting a still image while a moving image is being shot, it is necessary to suspend the shooting of the moving image.

An image capture apparatus that shoots still images and moving images using independent image sensors to eliminate the need to suspend the shooting of a moving image when shooting a still image while a moving image is being shot has therefor been proposed (Japanese Patent Laid-Open No. 2014-122957).

However, the image capture apparatus disclosed in Japanese Patent Laid-Open No. 2014-122957 requires multiple image sensors, a half mirror for supplying an optical image of a subject to the multiple image sensors, and the like, which is disadvantageous in terms of reducing component costs, making the apparatus smaller, and so on.

SUMMARY OF INVENTION

The present invention has been conceived in light of this problem with the conventional technique. The present invention makes it possible to suppress the loss of moving image frames using a simple configuration, in an image capture apparatus capable of shooting a still image while shooting a moving image and provides a method of controlling such an image capture apparatus.

According to an aspect of the present invention, there is provided an image capture apparatus comprising: an image sensor; transfer control means for reading out image data from the image sensor and outputting the data to an exterior; a memory connected to the transfer control means; and shooting control means for controlling operations of the image sensor and the transfer control means, wherein in the case where a still image shooting instruction has been made while shooting a moving image, the shooting control means: controls the timing at which the still image is shot by the image sensor so that a period in which still image data is read out from the image sensor does not overlap with a period in which moving image data is read out from the image sensor; and controls the operations of the transfer control means so that the transfer control means writes the still image data read out from the image sensor into the memory, and reads out and outputs the still image data from the memory during a period in which the moving image data read out from the image sensor is not output.

According to another aspect of the present invention, there is provided a method of controlling an image capture apparatus, the apparatus including an image sensor, transfer control means for reading out image data from the image sensor and outputting the data to an exterior, and a memory connected to the transfer control means, the method comprising: in the case where a still image shooting instruction has been made while shooting a moving image, controlling the timing at which the still image is shot by the image sensor so that a period in which still image data is read out from the image sensor does not overlap with a period in which moving image data is read out from the image sensor, and controlling operations of the transfer control means so that the still image data read out from the image sensor is written into the memory, and the still image data is read out and output from the memory during a period in which the moving image data read out from the image sensor is not output.

Further features of the present invention will become apparent from the following description of exemplary embodiments with reference to the attached drawings.

BRIEF DESCRIPTION OF DRAWINGS

FIG. 4A is a timing chart illustrating operations of the image sensor according to embodiments.

FIG. 4B is a timing chart illustrating operations of the image sensor according to embodiments.

FIG. 13B-1 is a flowchart pertaining to operations of the digital camera according to the second embodiment.

FIG. 13B-2 is a flowchart pertaining to operations of the digital camera according to the second embodiment.

FIG. 14C is a timing chart pertaining to operations of the digital camera according to the second embodiment.

DESCRIPTION OF EMBODIMENTS

Exemplary embodiments of the present invention will now be described in detail in accordance with the accompanying drawings. Although the following describes a digital camera as an example of an image capture apparatus according to embodiments of the present invention, the present invention can be applied in any electronic device that has functions for shooting moving images and still images and that can shoot a still image while shooting a moving image. "Electronic device" includes, but is not limited to, personal computers, mobile phones (including smartphones), tablet devices, game consoles, dashboard cameras, robots, household appliances, and the like.

First Embodiment

Figure 1:
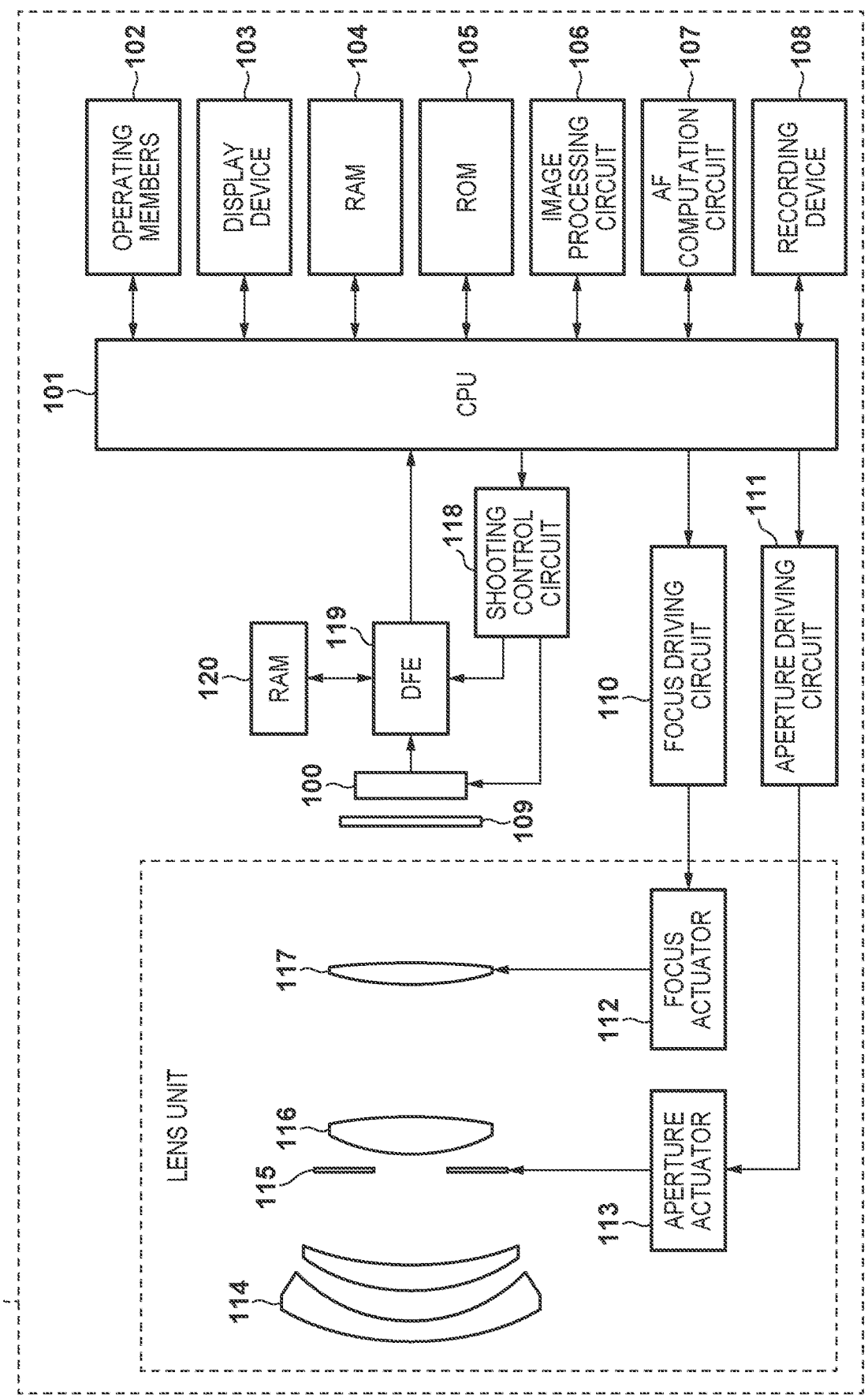
FIG. 1 is a diagram illustrating an example of the functional configuration of a digital camera according to embodiments.

FIG. 1 is a block diagram illustrating an example of the functional configuration of a digital camera 1000 serving as an image capture apparatus according to a first embodiment. Although the digital camera 1000 has a configuration in which a lens unit (an optical imaging system) is fixed to a camera body, the lens unit may be interchangeable instead.

A CPU 101 functions as a control circuit for the digital camera 1000 by, for example, loading programs stored in ROM 105 into RAM 104 and executing the programs. Accordingly, the CPU 101 realizes the functions of the digital camera 1000 by controlling various circuits in the digital camera 1000. Note that the CPU 101 may actually be constituted by multiple microprocessors.

An image sensor 100 is, for example, a CMOS image sensor or a CCD image sensor, and includes a plurality of photoelectric conversion elements arranged two-dimensionally, a microlens array, and the like. An optical image of a subject, formed by the lens unit, is converted into a plurality of analog pixel signals by the plurality of photoelectric conversion elements. The individual analog pixel signals are converted into digital pixel signals (pixel data) by an A/D conversion function of the image sensor 100, and are then output in sequence. Operations of the image sensor 100, including charge reset, accumulation, readout, A/D conversion, and pixel data output, are controlled by the CPU 101. If the image sensor 100 does not have an A/D conversion function, the analog pixel signals may be output from the image sensor 100 and converted into digital pixel signals by an external A/D converter.

A digital front-end (DFE) 119 has a data transfer control function for supplying the pixel data to the CPU 101. RAM 120, which is connected to the DFE 119, is memory (buffer memory) used in data transfer processing by the DFE 119.

A shooting control circuit 118 configures the image sensor 100 and the DFE 119, supplies signals for controlling operation timings, and the like under the control of the CPU 101. The operations of the shooting control circuit 118 and the DFE 119 will be described in detail later.

An image processing circuit 106 carries out various types of image processing on one screen's or one frame's worth of pixel data (image data). For example, the image processing circuit 106 can carry out image processing pertaining to demosaicing, white balance adjustment, various types of correction, object detection and recognition, motion detection, and encoding and decoding, but is not limited thereto. The image processing circuit 106 can also carry out image processing pertaining to the generation of evaluation values, signals, and the like used in automatic exposure control (AE) and automatic focus detection (AF). Although not particularly mentioned below, the CPU 101 executes AE processing, AF processing, and the like as appropriate on the basis of evaluation values obtained while shooting a moving image (for the purpose of a live view display or for recording), and controls the focal distance of the lens unit, shooting conditions of the image sensor 100, and the like. The frequency, conditions, and the like at which the AE processing and AF processing are carried out are not particularly limited, and can be based on any known method.

The RAM 104 is used as image memory for storing image data supplied by the CPU 101 through the DFE 119, image data processed by the image processing circuit 106, and the like. The RAM 104 is also used as work memory when the CPU 101 executes programs.

The ROM 105 can be electrically rewritten, for example, and stores programs that can be executed by the CPU 101, various setting values and default values, unique information of the digital camera 1000, GUI data, and the like.

A recording device 108 is non-volatile memory or a hard disk, for example. The recording device 108 records data obtained from shooting (still image data, moving image data, and audio data). The recording device 108, or a recording medium used by the recording device 108, may be removable.

"Operating members 102" is the collective name for an input device group, including buttons, switches, a touch panel, and the like, which a user uses to supply instructions to the digital camera 1000. A shutter button, a moving image shooting start/stop button, a playback mode/shooting mode switching button, a menu button, a directional key, and an OK button are typical input devices that constitute the operating members 102. The CPU 101 detects operations made through the operating members 102 and performs operations in accordance with the detected operation.

A display device 103 is a color LCD provided on an outer surface of the digital camera 1000, for example, and displays still images, moving images, menu screens, various setting values, and the like under the control of the CPU 101. The display device 103 can be caused to function as an electronic viewfinder (EVF) by shooting a moving image and displaying the shot moving image in the display device 103 substantially in real time. The image displayed when the display device 103 is caused to function as an EVF is called a "live view image" or a "through-the-lens image". The live view image is a moving image having a predetermined frame rate.

An AF computation circuit 107 carries out focal point detection processing on the basis of an AF evaluation value generated by the image processing circuit 106 (a pair of focal point detection signals used in a phase difference detection method, in the present embodiment), and calculates a defocus amount and direction of the lens unit, for example. The processing of the AF computation circuit 107 will be described in detail later.

Light entering the lens unit traverses a first lens group 114, an aperture stop 115, a second lens group 116, a third lens group 117, and a focal plane shutter 109, and is incident on the image sensor 100. The first lens group 114 is held so as to be capable of being driven forward and backward in an optical axis direction. The aperture stop 115 can adjust an aperture diameter using an aperture actuator 113. The aperture stop 115 and the second lens group 116 are capable of being driven forward and backward together in the optical axis direction, and by operating in tandem with the first lens group 114, implement a magnification function (a zoom function). The third lens group (focus lens) 117 adjusts the focal distance of the lens unit by being driven forward and backward in the optical axis direction.

The focal plane shutter 109 is a mechanical shutter that adjusts the exposure period when shooting a still image. Although the present embodiment assumes that the exposure period is adjusted using an electronic shutter when shooting a still image, the focal plane shutter 109 may be used instead. The operations of the focal plane shutter 109 are controlled by the CPU 10.

A focus driving circuit 110 drives a focus actuator 112 on the basis of a focal point detection result from the AF computation circuit 107, and adjusts the focal point by driving the third lens group 117 forward and backward in the optical axis direction. An aperture driving circuit 111 drives the aperture actuator 113 under the control of the CPU 101 executing AE processing, and adjusts the aperture diameter of the aperture stop 115.

Figure 2A:
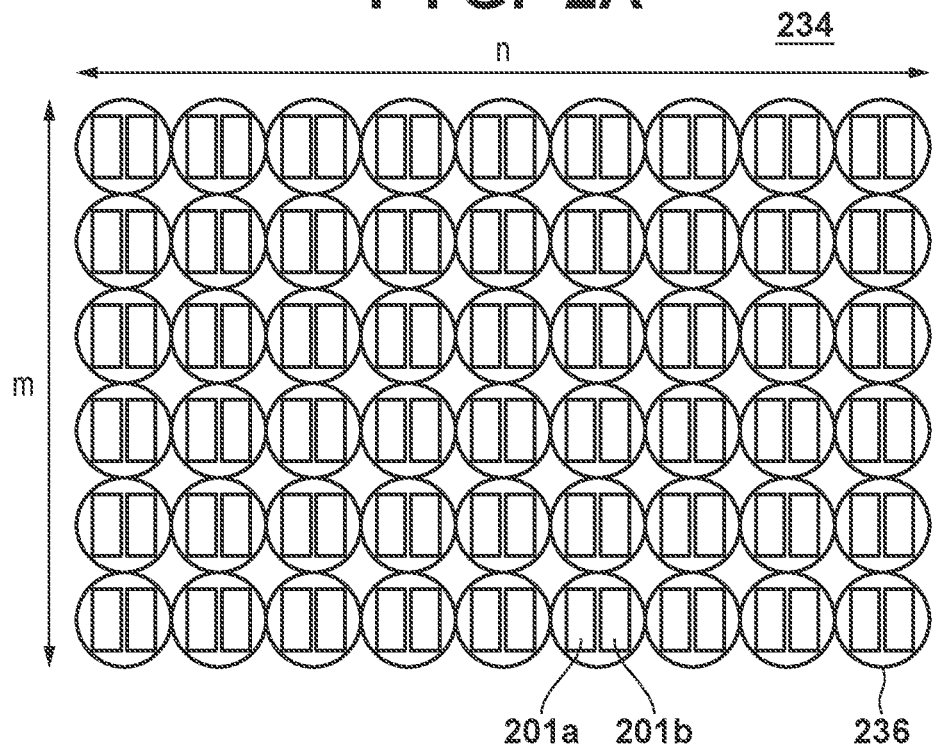
FIG. 2A is a diagram illustrating an example of the configuration of an image sensor according to embodiments.

An example of the configuration of the image sensor 100 according to the present embodiment will be described in detail next using FIGS. 2A to 3. FIG. 2A is a diagram schematically illustrating a pixel array 234 in the image sensor 100. The pixel array 234 has a configuration in which two photoelectric conversion elements 201a and 201b are shared by a single microlens 236. The configuration corresponding to a single microlens 236 will be called a "pixel" hereinafter, and the two photoelectric conversion elements 201a and 201b in each pixel will be called "subpixels". Accordingly, the image sensor 100 illustrated in FIG. 2A has n pixels in the horizontal direction and m pixels in the vertical direction, and has 2n subpixels in the horizontal direction. Although FIG. 2A illustrates a configuration in which n=9 and m=6, this is only for the sake of simplicity, and several hundreds of thousands to several tens of millions of pixels are actually provided.

Note that a single pixel may have three or more photoelectric conversion elements. With each pixel, charges can be read out from the subpixels individually, or the charges of the two subpixels can be read out together. This configuration makes it possible to obtain both focal point detection signals and image signals from the image sensor 100.

Figure 2B:
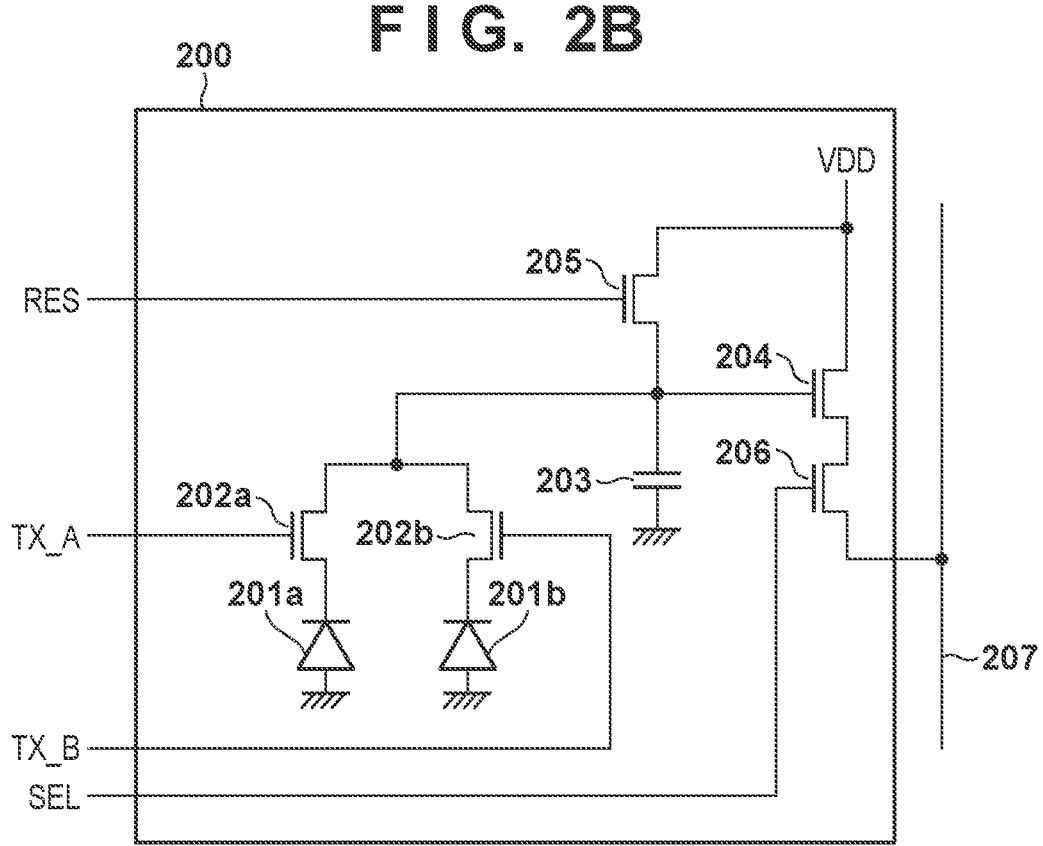
FIG. 2B is a diagram illustrating an example of the configuration of an image sensor according to embodiments.

FIG. 2B is a circuit diagram illustrating an example of the configuration of a single pixel 200. The pixel 200 includes photoelectric conversion elements (photodiodes; abbreviated "PD" hereinafter) 201a and 201b, transfer switches 202a and 202b, a floating diffusion (FD) region 203, an amplifying circuit 204, a reset switch 205, and a selection switch 206. Each switch is constituted by a MOS transistor or the like. Although the following descriptions assume that each switch is an N-type MOS transistor, each switch may be a P-type MOS transistor or another type of switching element instead.

The PDs 201a and 201b receive light passing through the same microlens 236 and generate charges in accordance with the amount of received light through photoelectric conversion. A signal based on the charge obtained from the PD 201a will be called an "A signal", and the signal based on the charge obtained from the PD 201b will be called a "B signal".

The transfer switch 202a is connected between the PD 201a and the FD region 203, and the transfer switch 202b is connected between the PD 201b and the FD region 203. The transfer switches 202a and 202b are elements that transfer the charges produced by the PDs 201a and 201b to the common FD region 203. The transfer switches 202a and 202b are controlled by control signals TX_A and TX_B supplied from a vertical scanning circuit 209.

The FD region 203 temporarily holds the charges transferred from the PDs 201a and 201b, and functions as a charge-voltage conversion portion that converts the held charges into a voltage signal. The amplifying circuit 204 is a source-follower MOS transistor. The gate of the amplifying circuit 204 is connected to the FD region 203, and the drain of the amplifying circuit 204 is connected to a common power source supplying a source potential VDD. The amplifying circuit 204 amplifies the voltage signal based on the charge held in the FD region 203 and outputs the amplified signal as a pixel signal.

The reset switch 205 is connected between the FD region 203 and the common power source. The reset switch 205 has a function for resetting the potential at the FD region 203 to the potential VDD of the common power source, and is controlled by a control signal RES supplied to the gate of the reset switch 205 from the vertical scanning circuit 209. The selection switch 206 is connected between the source of the amplifying circuit 204 and a vertical output line 207. The selection switch 206 is controlled by a control signal SEL supplied from the vertical scanning circuit 209, and outputs the pixel signal amplified by the amplifying circuit 204 to the vertical output line 207.

Figure 3:
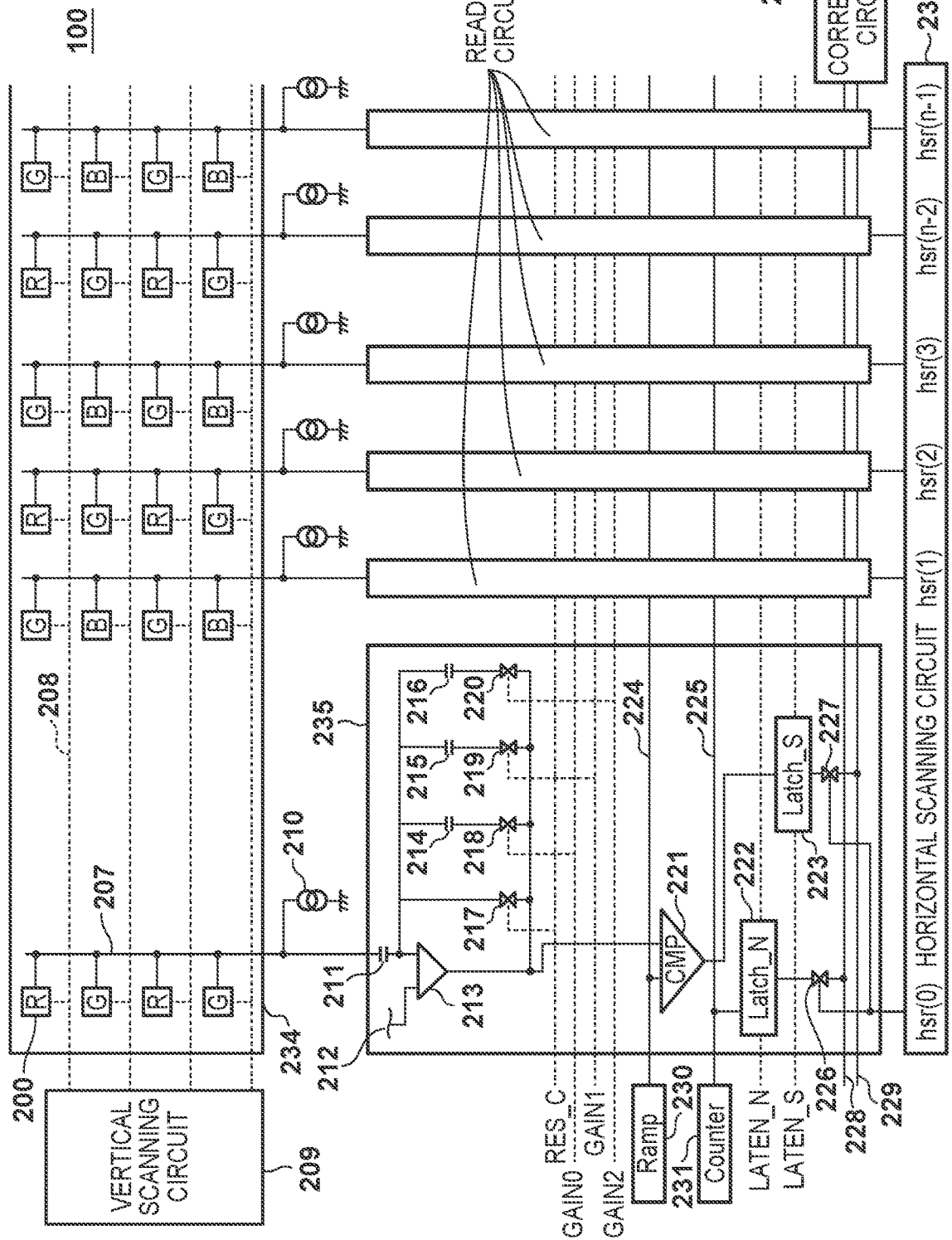
FIG. 3 is a diagram illustrating an example of the configuration of the image sensor according to embodiments.

FIG. 3 is a diagram illustrating an example of the configuration of the pixels in the image sensor 100 and the peripheral circuitry thereof. The image sensor 100 includes the pixel array 234, the vertical scanning circuit 209, a current source load 210, readout circuits 235, common output lines 228 and 229, a horizontal scanning circuit 232, a correction circuit 233, and a data output circuit 237.

Color filters are provided on the pixel array 234 in a primary color Bayer arrangement. As such, in FIG. 3, the individual pixels 200 are indicated as R (red), G (green), or B (blue) depending on the color of the color filter provided thereon. Note that only a small number of the pixels in the pixel array 234 are shown in FIG. 3 as well. A light-blocking region (an optical black (OB) region) is provided in part of the pixel array 234, and the pixels in the OB region are called "light-blocking pixels".

The vertical scanning circuit 209 outputs control signals to the pixels 200 on a row-by-row basis through driving signal lines 208, which are provided for each row of the pixel array 234. FIG. 3 illustrates one driving signal line 208 for each row for the sake of simplicity. However, in reality, a plurality of the driving signal lines 208 are connected to each of the rows.

Each of the vertical output lines 207, which are provided for each of the columns, is connected to one column's worth of the pixels 200. The pixel signals read out from the pixels 200 on a row-by-row basis are input to the readout circuits 235 through the vertical output lines 207. The readout circuits 235 generate pixel data by A/D-converting the pixel signals. The current source load 210 is connected for each of the vertical output lines 207.

The horizontal scanning circuit 232 selects the n readout circuits 235 in order, one at a time, by outputting control signals hsr(0) to hsr(n−1). The selected readout circuits 235 output the generated pixel data to the correction circuit 233 through the common output lines 228 and 229.

The correction circuit 233 carries out a correction process (described later) on the pixel data and then outputs the resulting data to the data output circuit 237. The data output circuit 237 converts the pixel data supplied from the correction circuit 233 into serial data and transfers that data to later-stage circuits as a differential signal. The data output circuit 237 may output the data through a method aside from a differential serial transfer method.

The circuit configuration of the readout circuits 235 will be described in detail next. Each of the readout circuits 235 includes a clamp capacitance 211, feedback capacitances 214 to 216, an op-amp 213, a reference voltage source 212, and switches 217 to 220. Each readout circuit 235 further includes a comparator 221, a Latch_N 222, a Latch_S 223, and switches 226 and 227. The individual readout circuits 235 have A/D conversion functions.

The pixel signal input to the readout circuit 235 through the vertical output line 207 is input to an inverting input terminal of the op-amp 213 via the clamp capacitance 211. A reference voltage Vref is supplied to a non-inverting input terminal of the op-amp 213 from the reference voltage source 212. The feedback capacitances 214 to 216 are connected between the inverting input terminal and an output terminal of the op-amp 213. The switch 217 is connected between the inverting input terminal and the output terminal of the op-amp 213, and has a function of shorting both ends of the feedback capacitances 214 to 216. The switch 217 is controlled by a control signal RES_C supplied by the shooting control circuit 118. The switches 218 to 220 are controlled by control signals GAIN0 to 2 supplied by the shooting control circuit 118.

The output terminal of the op-amp 213, and a ramp signal 224 output from a ramp signal generator 230, are connected to the comparator 221. The Latch_N 222 is a storage element for holding a noise level (N signal), whereas the Latch_S 223 is a storage element for holding the A or B signal, and an additive signal of the A signal and the B signal (an AB signal), as an S signal. The signal from the output terminal of the comparator 221, and a counter value 225 output from a counter 231, are input to the Latch_N 222 and the Latch_S 223. The Latch_N 222 and the Latch_S 223 are controlled by control signals LATEN_N and LATEN_S supplied from a timing generator (TG) (not shown) on the basis of settings from the shooting control circuit 118. The output terminals of the Latch_N 222 and the Latch_S 223 are connected to the common output lines 228 and 229 via the switches 226 and 227, respectively. The common output lines 228 and 229 are connected to the correction circuit 233.

The switches 226 and 227 are controlled by a control signal hsr(h) from the horizontal scanning circuit 232. Here, h represents the column number (where 0=<h=<n−1) of the readout circuit 235 to which the control signal line is connected. The signals held in the Latch_N 222 and the Latch_S 223 are output via the common output lines 228 and 229 and input to the correction circuit 233.

In the present embodiment, there are two readout modes: a first readout mode, in which only the additive signals of the A signals and the B signals (the AB signals) are read out from the pixels 200 of the image sensor 100, and a second readout mode, in which the A signals and the AB signals are read out. The A signals and AB signals read out in the second readout mode are used in focal point detection and/or image generation, whereas the AB signals read out in the first readout mode are used in image generation.

FIGS. 4A and 4B are timing charts pertaining to readout operations of the image sensor 100. Operations for reading out one row's worth of pixel signals will be described hereinafter with reference to FIGS. 3, 4A, and 4B. Note that each switch is assumed to be on when the control signal is H (level) and off when the control signal is L (level).

Readout operations in the first readout mode will be described first using FIG. 4A.

At time Ta1, the control signals TX_A and TX_B go to H, and the transfer switches 202a and 202b turn on. At this time, signal RES_C is H and the reset switch 205 is on, and thus the charges accumulated in the PDs 201a and 201b are transferred to the common power source via the transfer switches 202a and 202b and the reset switch 205, and the PDs 201a and 201b are reset.

At time Ta2, when the control signals TX_A and TX_B go to L, the transfer switches 202a and 202b turn off, and the photoelectric charges produced by the PDs 201a and 201b begin accumulating.

At time Ta3, which occurs after a predetermined charge accumulation time has passed following time Ta2, the control signal SEL for the selection switch 206 goes to H, and the source of the amplifying circuit 204 is connected to the vertical output line 207.

At time Ta4, the control signal RES for the reset switch 205 goes to L, and the resetting of the FD region 203 is canceled. At this time, the potential of the reset signal level (the noise (N) signal), which is based on the potential at the FD region 203, is read out to the vertical output line 207 via the amplifying circuit 204, and is input to the readout circuit 235.

Then, at time Ta5, the control signal RES_C goes to L, and a voltage based on the difference between the reset signal level read out to the vertical output line 207 and the reference voltage Vref is output from the op-amp 213. The CPU 101 sets one of the control signals GAIN0 to GAIN2 to H through the shooting control circuit 118, on the basis of an ISO sensitivity set in advance in the image sensor 100 through the operating members 102. Here, the control signals GAIN0, GAIN1, and GAIN2 are assumed to be set to H so as to correspond to ISO sensitivities of 100, 200, and 400, for example. Of the switches 218 to 220, the switch corresponding to the control signal GAINn that has gone to H is turned on. The op-amp 213 amplifies the input voltage at an inverting gain determined by the ratio of the clamp capacitance 211 or the feedback capacitances 214 to 216, and outputs the amplified voltage. Here, a random noise component arising in the circuitry leading up to the op-amp 213 is also amplified, and thus the ISO sensitivities of 100, 200, and 400 will have different random noise amounts in the output signals.

Next, at time Ta6, the ramp signal generator 230 begins outputting a ramp signal having a signal level that changes in proportion to the amount of time that has passed. The counter 231 also begins counting up from a reset state. Furthermore, the control signal LATEN_N goes to H. The comparator 221 compares the signal output from the op-amp 213 with the ramp signal output by the ramp signal generator 230.

At time Ta7, when the level of the ramp signal exceeds the value of the signal output by the op-amp 213, the comparator 221 inverts the signal output from the Latch_N 222 from L to H. When the signal from the comparator 221 inverts from L to H while the control signal LATEN_N is at H, the Latch_N 222 stores the counter value output from the counter 231 at that point in time. In other words, the Latch_N 222 stores a digital value of the noise signal (N signal) (i.e., stores N signal data).

Then, at time Ta8, the ramp signal stops changing, and the control signal LATEN_N goes to L.

At time Ta9, the control signals TX_A and TX_B go to H, and the transfer switches 202a and 202b turn on. At this time, the signal RES_C is at L and the reset switch 205 is off, and thus the charges accumulated in the PDs 201a and 201b begin being transferred to the FD region 203.

Then, at time Ta10, when the control signals TX_A and TX_B go to L, the transfer of the photoelectric charges ends. The charges transferred to the FD region 203 are converted to a voltage at the FD region 203, and the voltage is output to the readout circuit 235 as a pixel signal via the amplifying circuit 204 and the vertical output line 207. A voltage based on the difference between the reset signal level read out to the vertical output line 207 and the reference voltage Vref is output from the op-amp 213. The op-amp 213 amplifies the input voltage at an inverting gain determined by the ratio of the clamp capacitance 211 or the feedback capacitances 214 to 216, and outputs the amplified voltage.

Next, at time Ta11, the ramp signal generator 230 begins outputting the ramp signal. The counter 231 also begins counting up from the reset state, and the control signal LATEN_S goes to H. The comparator 221 compares the signal output from the op-amp 213 with the ramp signal output by the ramp signal generator 230.

At time Ta12, when the level of the ramp signal exceeds the value of the signal output by the op-amp 213, the comparator 221 inverts the signal output from the Latch_S 223 from L to H. When the signal from the comparator 221 inverts from L to H while the control signal LATEN_S is at H, the Latch_S 223 stores the counter value output from the counter 231 at that point in time. In other words, the Latch_S 223 stores a digital value of the additive signal (AB signal) (i.e., stores AB signal data).

Then, at time Ta13, the ramp signal stops changing, and the control signal LATEN_S goes to L.

Then, from time Ta14 to Ta15, the control signal hsr(h) output from the horizontal scanning circuit 232 goes to H every set period, in order starting from h=0. The switches 226 and 227 of the readout circuit 235 for which the control signal hsr(h) has gone to H each turn on for a set period, and the N signal data and AB signal data held in the Latch_N 222 and the Latch_S 223 are read out to the common output lines 228 and 229, respectively. The correction circuit 233 calculates a difference between the read-out AB signal data and N signal data (image signal data Pab), and carries out a correction process (described later) on the image signal data Pab. The correction circuit 233 outputs the data to the exterior from a data output circuit after carrying out the correction process.

At time Ta16, the control signal RES_C goes to H and the switch 217 turns on.

At time Ta17, the control signal RES goes to H and the reset switch 205 turns on.

At time Ta18, the control signal SEL goes to L and the operation for reading out one row in the first readout mode ends.

Readout operations in the second readout mode will be described next using FIG. 4B.

The operations from time Tb1 to Tb8 are the same as the operations from time Ta1 to Ta8 in FIG. 4A, and will therefore not be described.

At time Tb9, the control signal TX_A goes to H with the control signal TX_B remaining at L, and the photoelectric charge accumulated in the PD 201a from time Tb2 to Tb3 begins being transferred to the FD region 203 through the transfer transistor 202a.

Then, at time Ta10, the control signal TX_A goes to L, the transfer transistor 202a turns off, and the transfer of the photoelectric charges ends. The charges transferred to the FD region 203 are converted to a voltage at the FD region 203, and the voltage is output to the readout circuit 235 as a pixel signal via the amplifying circuit 204 and the vertical output line 207. A voltage based on the difference between the reset signal level read out to the vertical output line 207 and the reference voltage Vref is output from the op-amp 213. The op-amp 213 amplifies the input voltage at an inverting gain determined by the ratio of the clamp capacitance 211 or the feedback capacitances 214 to 216, and outputs the amplified voltage.

Next, at time Tb11, the ramp signal generator 230 begins outputting the ramp signal. The counter 231 also begins counting up from the reset state, and the control signal LATEN_S goes to H. The comparator 221 compares the signal output from the op-amp 213 with the ramp signal output by the ramp signal generator 230.

At time Tb12, when the level of the ramp signal exceeds the value of the signal output by the op-amp 213, the comparator 221 inverts the signal output from the Latch_S 223 from L to H. When the signal from the comparator 221 inverts from L to H while the control signal LATEN_S is at H, the Latch_S 223 stores the counter value output from the counter 231 at that point in time. In other words, the Latch_S 223 stores a digital value of the A signal (i.e., stores A signal data).

Then, at time Tb13, the ramp signal stops changing, and the control signal LATEN_S goes to L.

Then, from time Tb14 to Tb5, the control signal hsr(h) output from the horizontal scanning circuit 232 goes to H every set period, in order starting from h=0. The switches 226 and 227 of the readout circuit 235 for which the control signal hsr(h) has gone to H each turn on for a set period, and the N signal data and A signal data held in the Latch_N 222 and the Latch_S 223 are read out to the common output lines 228 and 229, respectively. The correction circuit 233 calculates a difference between the read-out A signal data and N signal data (image signal data Pa), and carries out a correction process (described later) on the image signal data Pa. The correction circuit 233 outputs the data to the exterior from a data output circuit after carrying out the correction process.

Next, at time Tb16, the control signals TX_A and TX_B go to H, and the transfer switches 202a and 202b turn on. The charges accumulated in the PDs 201a and 201b begin being transferred to the FD region 203.

Then, at time Tb17, when the control signals TX_A and TX_B go to L, the transfer of the photoelectric charges ends. The charges transferred to the FD region 203 are converted to a voltage at the FD region 203, and the voltage is output to the readout circuit 235 as a pixel signal via the amplifying circuit 204 and the vertical output line 207. A voltage based on the difference between the reset signal level read out to the vertical output line 207 and the reference voltage Vref is output from the op-amp 213. The op-amp 213 amplifies the input voltage at an inverting gain determined by the ratio of the clamp capacitance 211 or the feedback capacitances 214 to 216, and outputs the amplified voltage.

Next, at time Tb18, the ramp signal generator 230 begins outputting the ramp signal. The counter 231 also begins counting up from the reset state, and the control signal LATEN_S goes to H. The comparator 221 compares the signal output from the op-amp 213 with the ramp signal output by the ramp signal generator 230.

At time Tb9, when the level of the ramp signal exceeds the value of the signal output by the op-amp 213, the comparator 221 inverts the signal output from the Latch_S 223 from L to H. When the signal from the comparator 221 inverts from L to H while the control signal LATEN_S is at H, the Latch_S 223 stores the counter value output from the counter 231 at that point in time. In other words, the Latch_S 223 stores a digital value of the additive signal (AB signal) (i.e., stores AB signal data).

Then, at time Tb20, the ramp signal stops changing, and the control signal LATEN_S goes to L.

Then, from time Tb21 to Tb22, the control signal hsr(h) output from the horizontal scanning circuit 232 goes to H every set period, in order starting from h=0. The switches 226 and 227 of the readout circuit 235 for which the control signal hsr(h) has gone to H each turn on for a set period, and the N signal data and AB signal data held in the Latch_N 222 and the Latch_S 223 are read out to the common output lines 228 and 229, respectively. The correction circuit 233 calculates a difference between the read-out AB signal data and N signal data (image signal data Pab), and carries out a correction process (described later) on the image signal data Pab. The correction circuit 233 outputs the data to the exterior from a data output circuit after carrying out the correction process.

At time Tb23, the control signal RES_C goes to H and the switch 217 turns on.

At time Tb24, the control signal RES goes to H and the reset switch 205 turns on.

At time Tb25, the control signal SEL goes to L and the operation for reading out one row in the second readout mode ends.

Figure 5A:
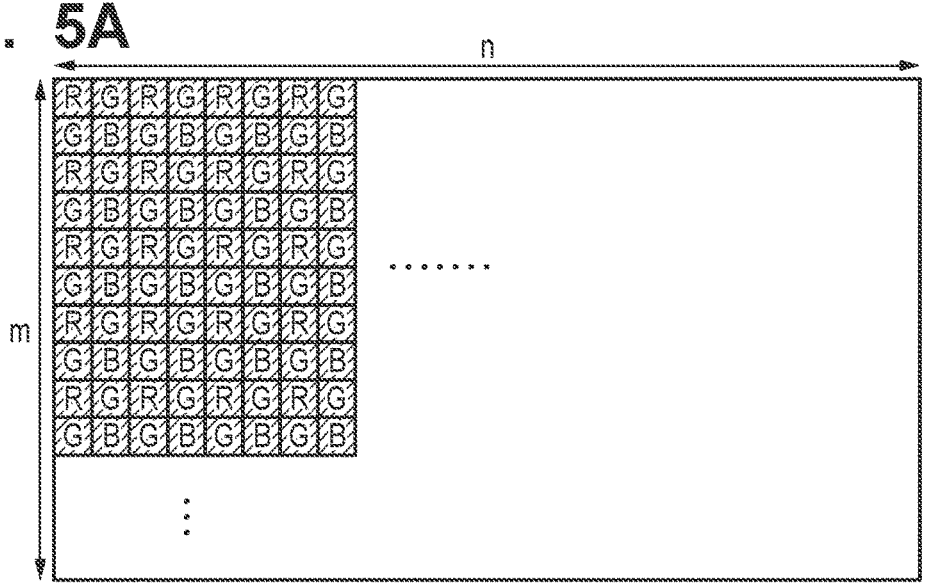
FIG. 5A is a diagram pertaining to readout modes according to embodiments.
Figure 5B:
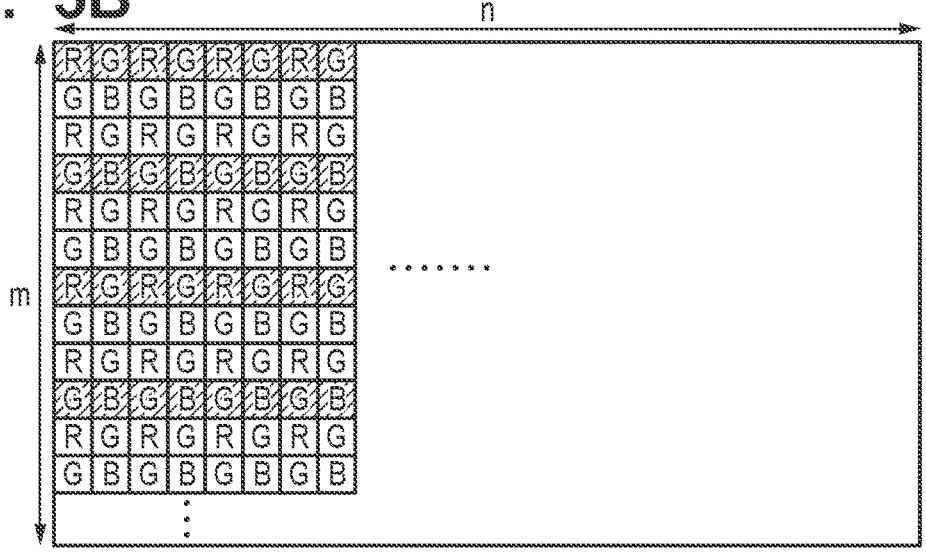
FIG. 5B is a diagram pertaining to readout modes according to embodiments.

The digital camera 1000 has a still image mode and a moving image mode with respect to the pixels read out from the image sensor 100. In the still image mode, pixel data is read out from the pixels indicated by the hatching in FIG. 5A. In other words, all the pixel data is read out from an effective pixel region of the pixel array 234 in the image sensor 100 (a region aside from the OB region). On the other hand, in the moving image mode, pixel data is read out from the pixels indicated by the hatching in FIG. 5B. In other words, the pixel data is read out from only some of the pixels in the effective pixel region of the pixel array 234. Here, a configuration in which the pixel data is read out every three rows, for a lower number of readout rows than in the still image mode, is employed as one example. Note that the pixels may be thinned within the rows as well. The resolution of the image data read out in the moving image mode is determined on the basis of a resolution at which the live view image is displayed in the display device 103, if the moving image is used for live view display, and on the basis of a set resolution, if the moving image is to be recorded. Normally, the moving image to be recorded has a higher resolution than the moving image for live view display. As such, the moving image to be recorded has a higher data rate than the moving image for live view display.

In the still image mode, the image data is read out in the first readout mode, and in the moving image mode, the image data is read out in the second readout mode. Accordingly, in the present embodiment, one frame's worth of image data in the moving image mode has a smaller data amount than one frame's worth of image data in the still image mode.

Additionally, in the present embodiment, exposure control is carried out through slit rolling shutter operations in both the still image mode and the moving image mode. When no descriptions of the accumulation period are given, it is assumed that scanning is carried out so that the anteroposterior relationship between the PD reset at the start of accumulation and the readout operations remains the same.

The principles of focal point detection in a phase difference detection method (phase difference AF) using the A signal and the B signal obtained from the image sensor 100 will be described next. Note that the B signal can be obtained using the AB signal and the A signal read out in the second readout mode, by subtracting the A signal from the AB signal.

First, the relationship between the phase difference between the A signal and the B signal, and a defocus amount, will be described using FIGS. 6A and 6B.

Figure 6A:
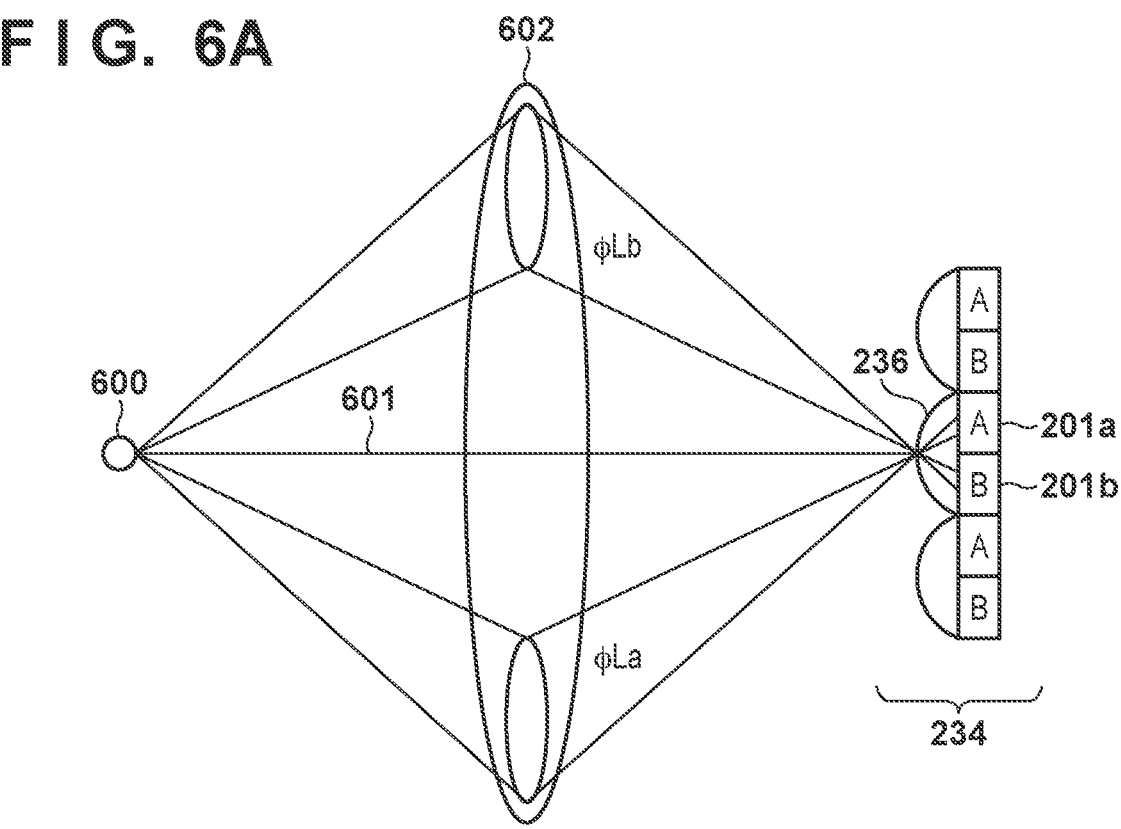
FIG. 6A is a diagram illustrating principles of phase difference AF according to embodiments.
Figure 6B:
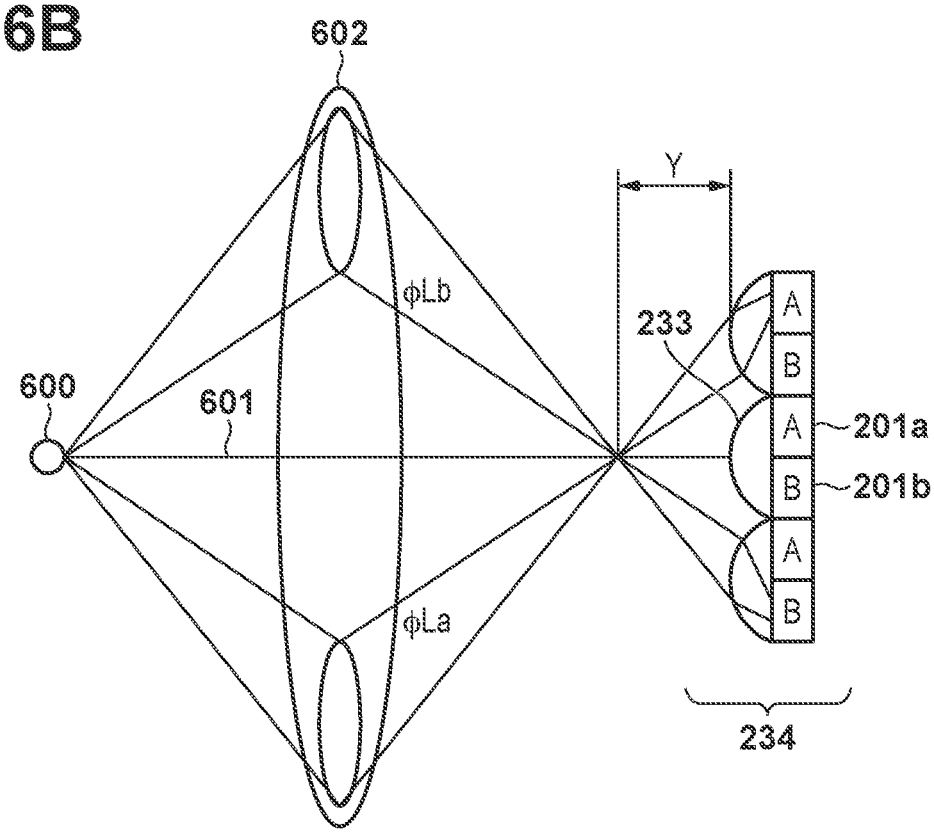
FIG. 6B is a diagram illustrating principles of phase difference AF according to embodiments.

FIG. 6A illustrates the positional relationship of an imaging lens 602, an optical axis 601, and the pixel array 234, and a light beam, in a case where a subject 600 is in focus. FIG. 6B illustrates the same positional relationship and light beam in a case where the subject is not in focus. In FIGS. 6A and 6B, the pixel array 234 is illustrated so that the left-right direction of the drawing corresponds to the thickness direction of the image sensor.

As illustrated in FIG. 2A, a single microlens 236 is provided for each pixel in the pixel array 234, and the PDs 201a and 201b receive the light that has passed through the same microlens 236. The PDs 201a and 201b have different viewpoints, and thus the A signal obtained by the PD 201a and the B signal obtained by the PD 201b are parallax signals.

The imaging lens 602 is represented as a single lens that includes the first lens group 114, the second lens group 116, and the third lens group 117 illustrated in FIG. 1. Incident light from the subject 600 passes through each region of the imaging lens 602 central to an optical axis 301 and forms an image on the pixel array 234 of the image sensor 100. Note that the position of the exit pupil coincides with the position of the center of the imaging lens 602.

As illustrated in FIG. 6A, in each pixel, the PD 201a and the PD 201b receive light beams from different partial pupil regions of the exit pupil of the optical imaging system. Accordingly, the defocus amount of the imaging lens 602 can be obtained by detecting a phase difference between an A signal group (A image) obtained from the PD 201a and a B signal group (B image) obtained from the PD 201b for a plurality of pixels within a focal point detection region. The AB signal of each pixel can be used as an image signal.

The light beam incident from one point of the subject 600 can be divided into a light beam ΦLa incident on the PD 201a through the partial pupil region corresponding to the PD 201a and a light beam ΦLb incident on the PD 201b through the partial pupil region corresponding to the PD 201b. The two light beams ΦLa and ΦLb are incident from the same point of the subject 600, and thus reach a single point on the image sensor when the imaging lens 602 is focused on the subject 600 (FIG. 6A). The A image and the B image therefore coincide with each other.

However, if the focal position is shifted by Y in the optical axis direction (FIG. 6B), the positions where the light beams ΦLa and ΦLb reach will be shifted from each other in the vertical direction relative to the optical axis, by an amount equivalent to the difference in the incident angles of the light beams ΦLa and ΦLb on the microlens 236. A phase difference therefore arises between the A image and the B image. The defocus amount and direction of the imaging lens 602 can be obtained by detecting the phase difference between the A image and the B image.

In the present embodiment, the image data is read out in the second readout mode when in the moving image mode. The A image and AB image obtained from a plurality of pixels within a predetermined focal point detection region are input to the AF computation circuit 107, and the A image is subtracted from the AB image. The B image is generated as a result, and is used in the AF processing along with the A image.

Although the present embodiment describes a configuration in which a plurality of photoelectric conversion elements are provided for each microlens, the A image and the B image can be obtained using a different pixel configuration as well. For example, it is also possible to provide a single photoelectric conversion element for each microlens, partially block the photoelectric conversion element using a light-blocking layer or the like, and then form a pixel having a photoelectric conversion element corresponding to the PD 201a and a pixel having a photoelectric conversion element corresponding to the PD 201b. In this case, the pixels for which light is partially blocked are treated as defective pixels when obtaining the image data.

Figure 7A:
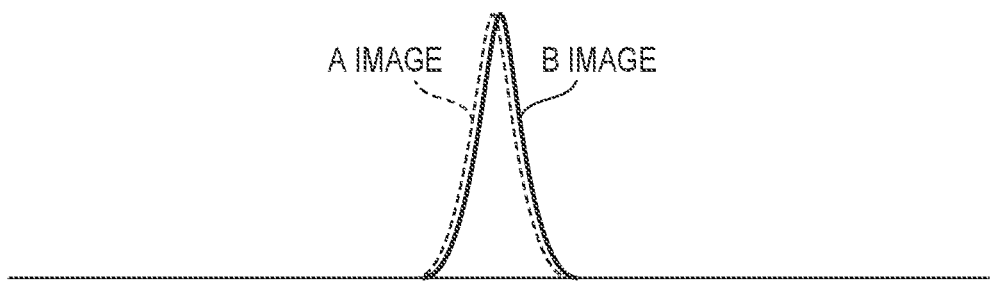
FIG. 7A is a diagram illustrating principles of phase difference AF according to embodiments.
Figure 7B:
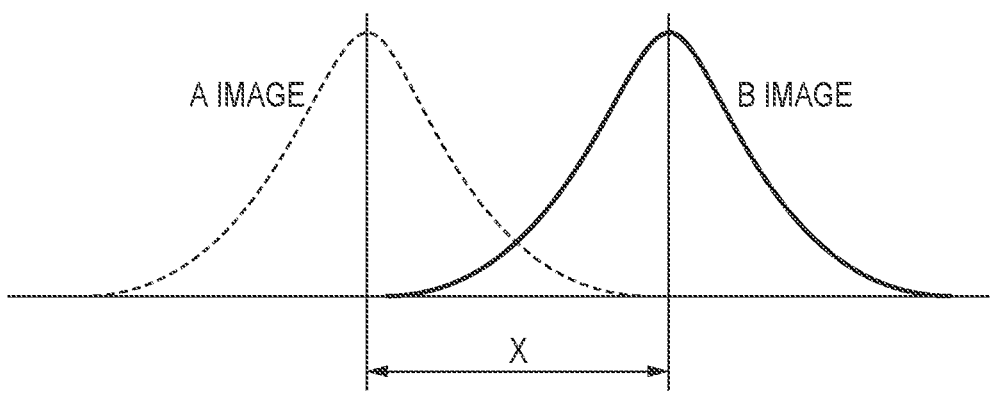
FIG. 7B is a diagram illustrating principles of phase difference AF according to embodiments.

The AF computation circuit 107 finds the defocus amount and direction of the imaging lens 602 by detecting the phase difference between the A image and the B image. FIG. 7A is a diagram illustrating intensity distributions of the A image and the B image when the imaging lens 602 is focused on the subject. The horizontal axis represents a pixel position and the vertical axis represents a signal intensity. The A image and the B image coincide when the subject is in focus. On the other hand, FIG. 7B is a diagram illustrating intensity distributions of the A image and the B image when the imaging lens 602 is not focused on the subject. In this case, the A image and the B image have a phase difference for the reason described above, and peak positions of the intensities are shifted by a shift amount X. The AF computation circuit 107 detects the shift amount X for each frame read out in sequence in the moving image mode and calculates the defocus amount of the imaging lens 602, i.e., the Y value indicated in FIG. 6B. The AF computation circuit 107 transfers the calculated Y value to the focus driving circuit 110 through the CPU 101.

The focus driving circuit 110 determines a drive amount and drive direction of the third lens group 117 on the basis of the Y value obtained from the AF computation circuit 107, and outputs corresponding drive signals to the focus actuator 112. The third lens group 117 moves to an in-focus position through the driving of the focus actuator 112.

Figure 8:
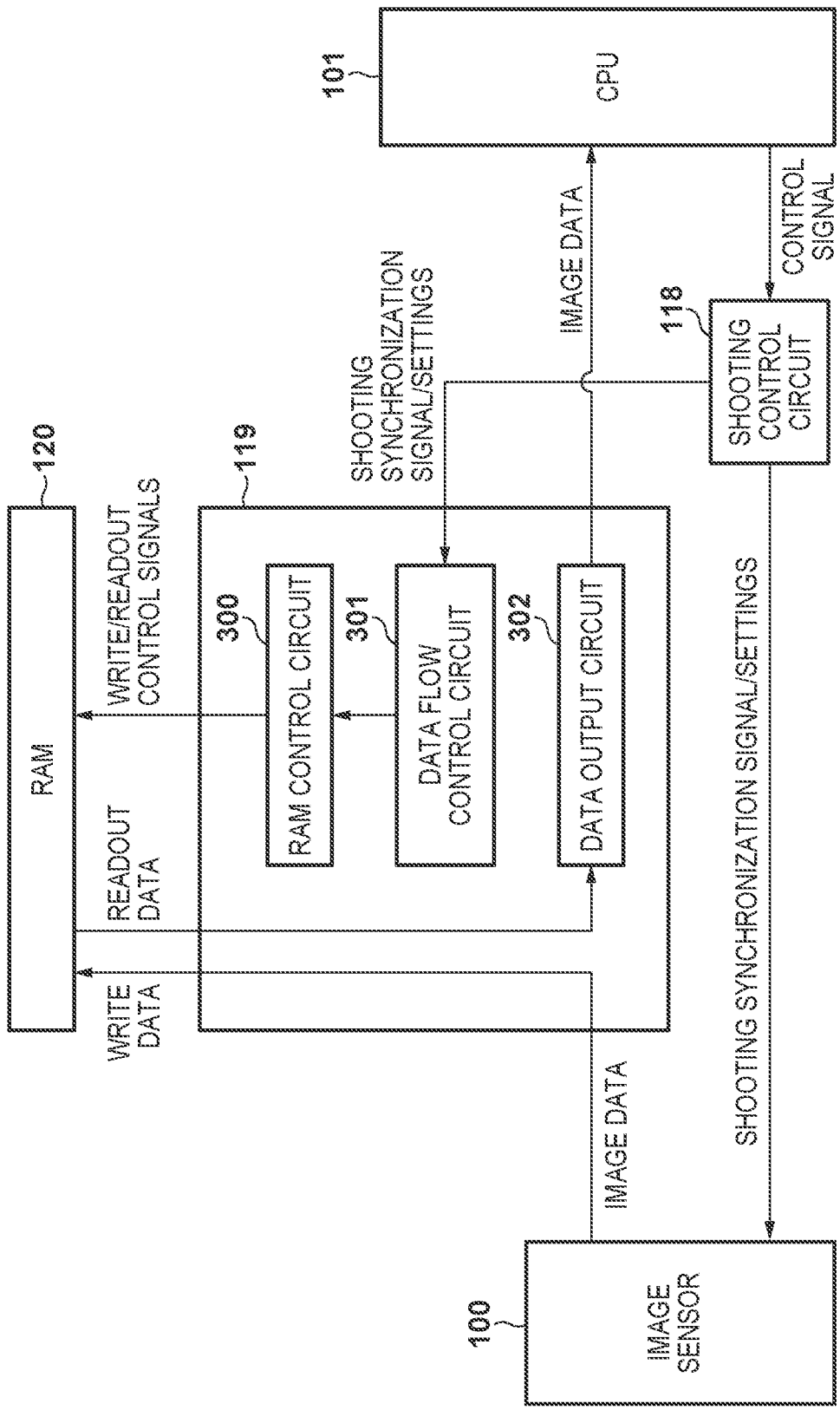
FIG. 8 is a block diagram illustrating an example of the functional configuration of a DFE according to a first embodiment.

Operations for transferring the image data read out from the image sensor 100 will be described next. FIG. 8 illustrates constituent elements pertaining to the transfer of image data and the connection relationships thereof, as well as an example of the functional configuration of the DFE 119. The DFE 119 includes a RAM control circuit 300, a data flow control circuit 301, and a data output circuit 302. The DFE 119 can be realized by a hardware circuit such as an ASIC or an FPGA, but may also be realized by a programmable processor executing programs.

When shooting a still image or a moving image, the CPU 101 outputs control signals to the shooting control circuit 118, instructing the readout mode and the start of shooting. On the basis of the control signals from the CPU 101, the shooting control circuit 118 sets the readout mode, shooting information such as the shooting sensitivity (GAIN #), and the like in the image sensor 100. The shooting control circuit 118 also supplies the control signals described with reference to FIGS. 3 to 4B to the image sensor 100 and the data flow control circuit 301 of the DFE 119. The shooting control circuit 118 furthermore sets the readout mode, a data size (resolution), and the like in the data flow control circuit 301 of the DFE 119.

The image sensor 100 carries out the reset, exposure, and readout as described with reference to FIG. 4, in accordance with the control signals and settings input from the shooting control circuit 118, and outputs the image data. The image data output from the image sensor 100 is input to the DFE 119. On the basis of the control signals supplied from the shooting control circuit 118 and the settings for the readout mode, the data size, and the like, the data flow control circuit 301 sets, in the RAM control circuit 300, an address, a data size, a timing, and the like for writing the image data into the RAM 120. The RAM control circuit 300 carries out control for writing the image data into the RAM 120 on the basis of the settings made by the data flow control circuit 301. As a result, the image data output from the image sensor 100 is written into the RAM 120.

The data flow control circuit 301 also sets a readout address, data size (resolution), timing, and the like in the RAM control circuit 300, at a timing that will be described later. The RAM control circuit 300 controls the readout from the RAM 120 on the basis of these settings, and reads out the image data from the RAM 120. The read-out image data is input to the CPU 101 through the data output circuit 302. The data output circuit 302 uses a differential serial transfer method, and is constituted by a plurality of data lanes. The image data read out from the RAM 120 is converted into serial data, and the data is transferred to later-stage circuits as a differential signal. Although the present embodiment describes a differential serial transfer method, the embodiment is not limited thereto.

Additionally, the present embodiment assumes that the output data rate of the data output circuit 302 is lower than the output data rate of the data output circuit 237 in the image sensor 100. Thus as will be described later, it takes more time to transfer data of the same size when outputting the data from the DFE 119 than when outputting the data from the image sensor 100. However, the output data rate relationship is not limited thereto, and a configuration in which it takes more time when outputting the data from the image sensor 100 than when outputting the data from the DFE 119 may be employed instead.

Figure 10A:
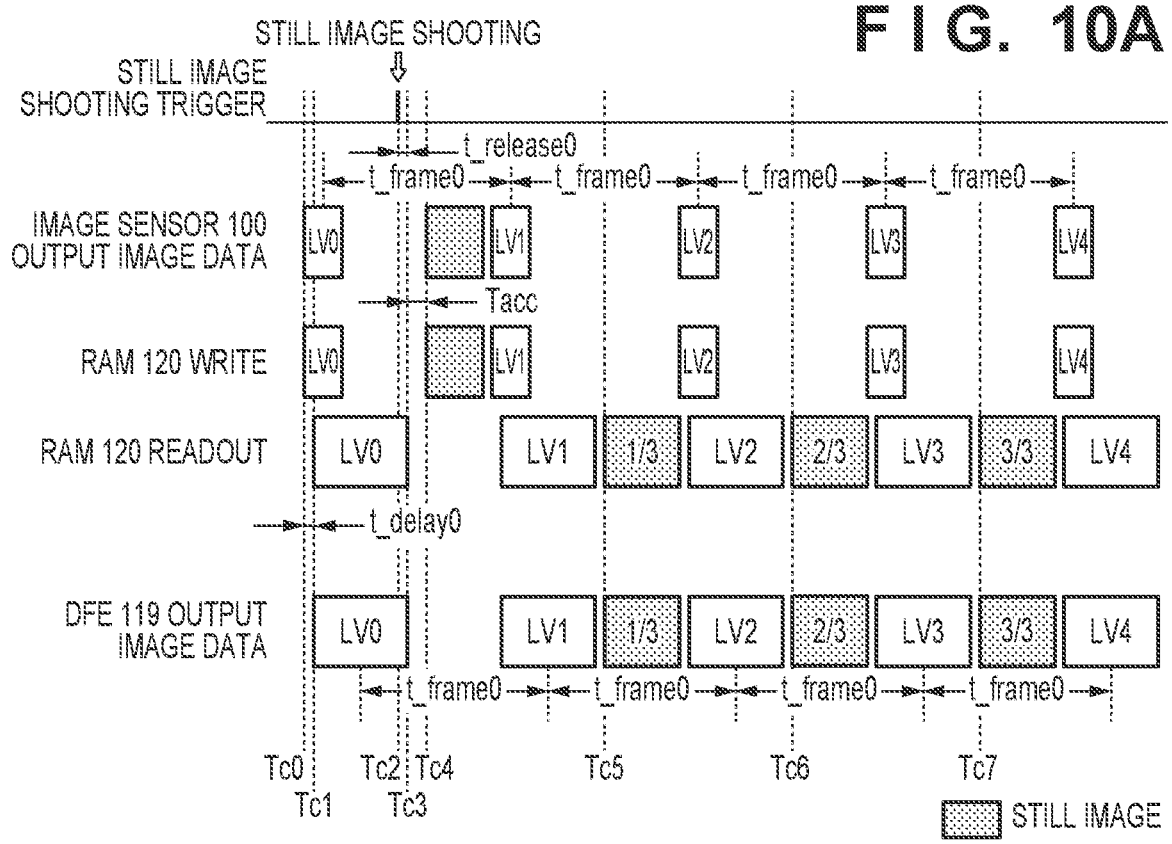
FIG. 10A is a timing chart pertaining to operations of the digital camera according to the first embodiment.
Figure 10B:
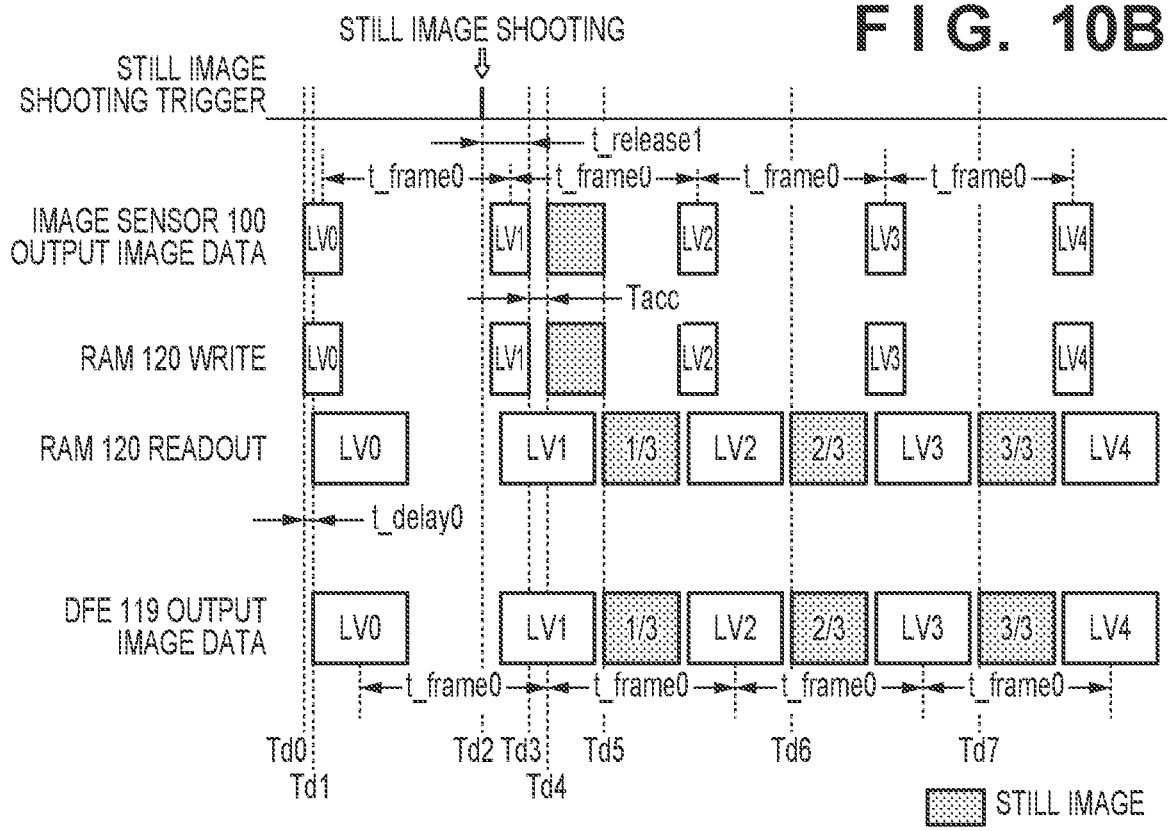
FIG. 10B is a timing chart pertaining to operations of the digital camera according to the first embodiment.
Figure 11A:
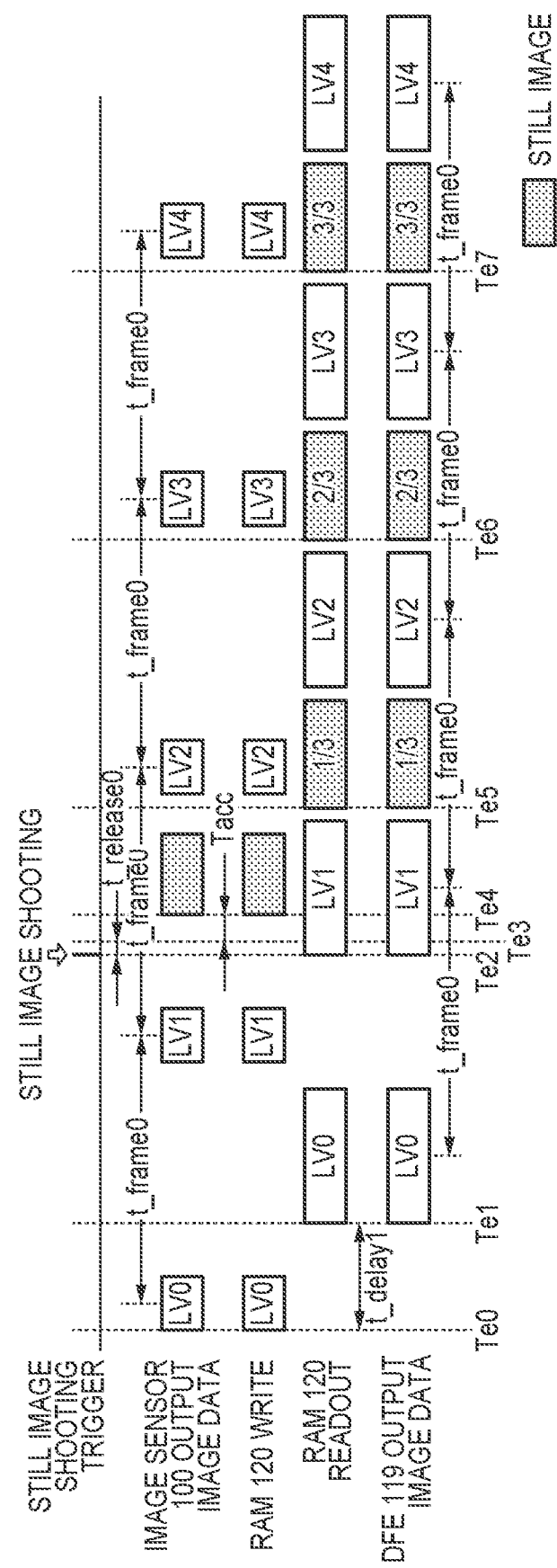
FIG. 11A is a timing chart pertaining to operations of the digital camera according to the first embodiment.
Figure 11B:
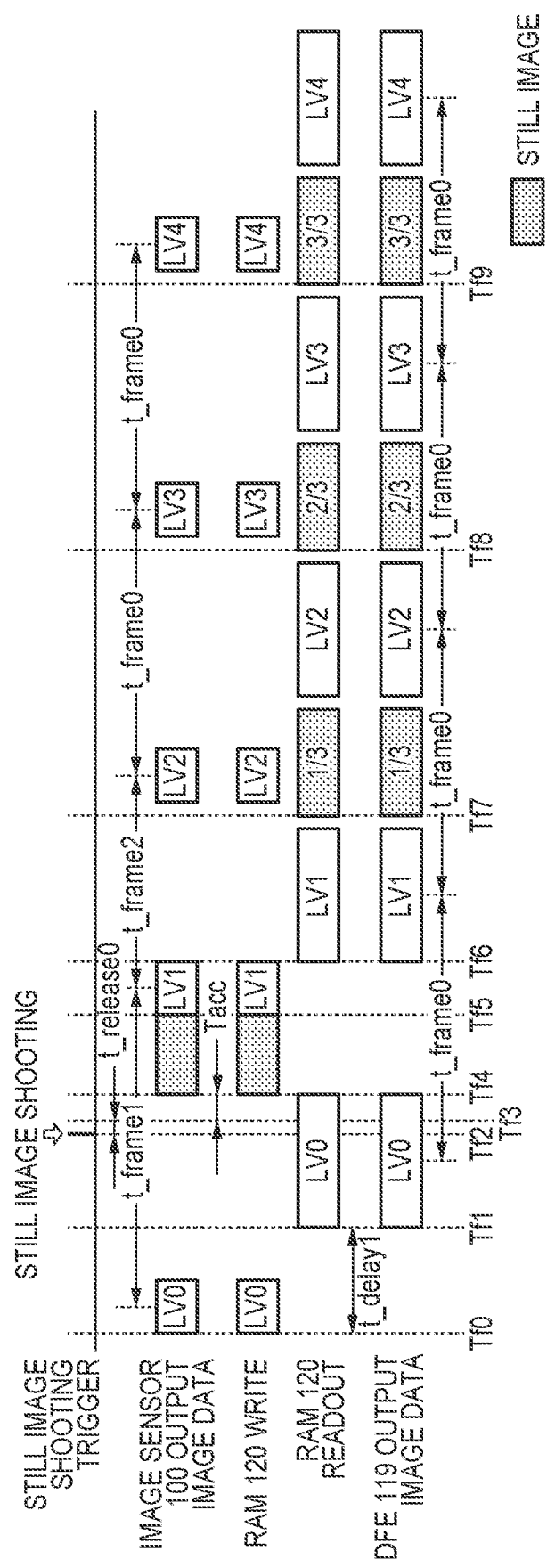
FIG. 11B is a timing chart pertaining to operations of the digital camera according to the first embodiment.

Operations of the digital camera 1000 according to the present embodiment will be described next with reference to FIGS. 9A to 11B. FIGS. 10A and 10B are timing charts for a case where still image shooting timings are different when the still image shooting mode, which will be described later, is a display priority mode. FIGS. 11A and 11B are timing charts for a case where still image shooting timings are different when the still image shooting mode, which will be described later, is a release priority mode.

Figure 9A:
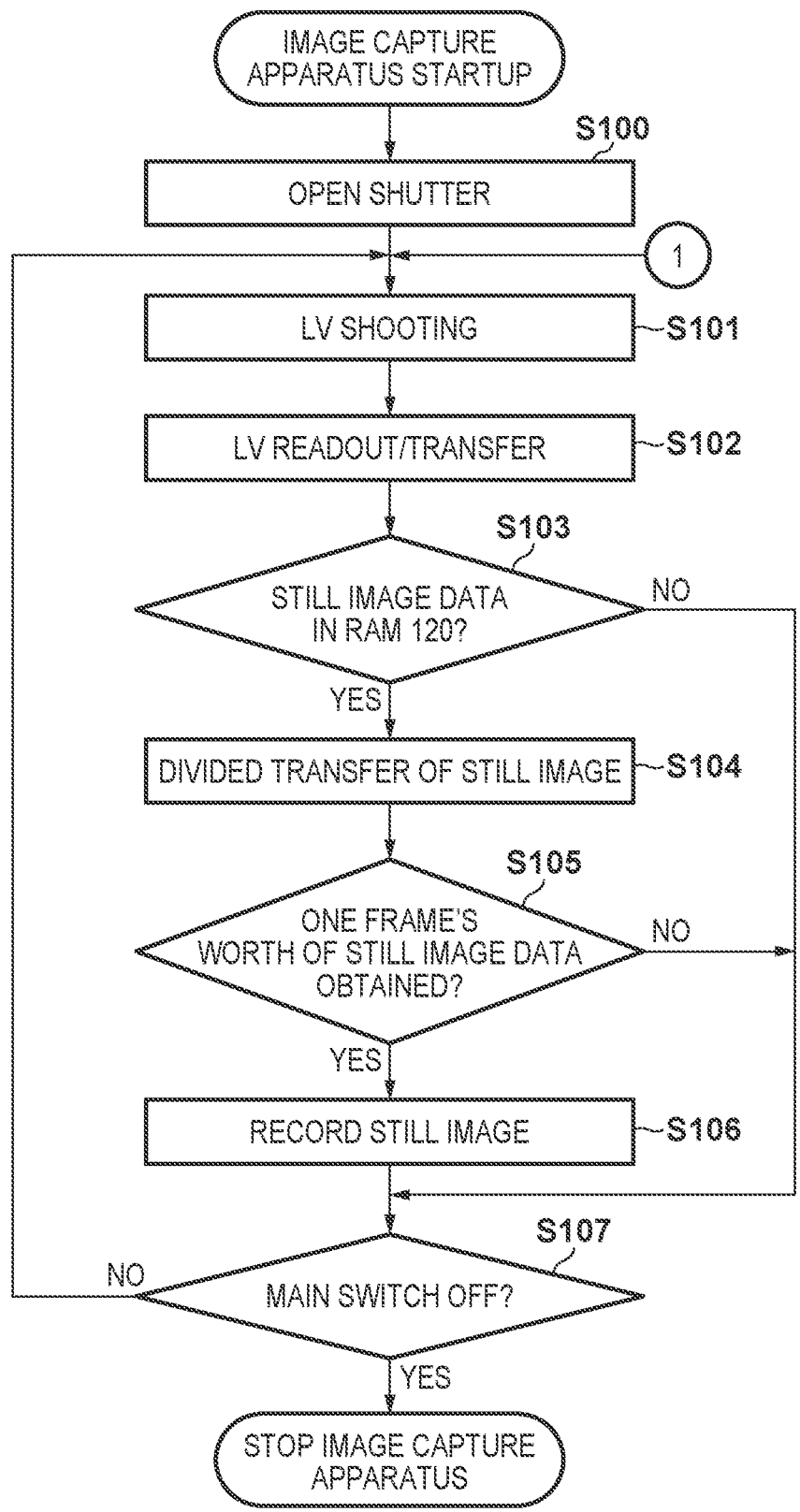
FIG. 9A is a flowchart pertaining to operations of the digital camera according to the first embodiment.

FIG. 9A is a flowchart pertaining to overall operations from startup to stopping. When the user turns the digital camera 1000 on by operating the operating members 102, the CPU 101 executes startup processing such as initialization, and enters a shooting standby state.

In step S100, the CPU 101 opens the focal plane shutter 109 and puts the image sensor 100 in an exposed state in order to display a live view while in the shooting standby state.

In step S101, the shooting control circuit 118 sets moving image shooting conditions for live view display in the image sensor 100 under the control of the CPU 101. The shooting control circuit 118 sets the moving image mode, ISO sensitivity, exposure time, and the like, for example. Additionally, under the control of the CPU 101, the shooting control circuit 118 sets the data size (resolution) and the time difference (t_delay0 and t_delay1, which will be described later) of the moving image data in the data flow control circuit 301. This time difference is the amount of time from when the live view image data is written into the RAM 120 to when that data is read out.

The shooting control circuit 118 sets t_delay0 as the time difference when in the display priority mode (described later), and sets t_delay1 as the time difference when in the release priority mode (described later).

In step S102, the image sensor 100 starts shooting a moving image under the set shooting conditions. When the first frame is shot, live view (LV) image data LV0 for the 0th frame is output from the image sensor 100, as indicated by Tc0 in FIG. 10A, Td0 in FIG. 10B, Te0 in FIG. 11A, and Tf0 in FIG. 11B.

The image data LV0 output from the image sensor 100 is written directly into the RAM 120. On the basis of the settings made in the shooting control circuit 118, the data flow control circuit 301 sends a readout start signal to the RAM control circuit 300 upon a predetermined time t_delay0 passing. In response, the RAM control circuit 300 reads out the image data from the RAM 120 (Tc1 in FIG. 10A, Td1 in FIG. 10B, Te1 in FIG. 11A, and Tf1 in FIG. 11B). The LV data output from the RAM 120 is output from the data output circuit 302 to the CPU 101.

The LV data output to the CPU 101 is transferred to the image processing circuit 106 by the CPU 101. The image processing circuit 106 carries out predetermined image processing on the LV data, and displays the resulting data as a live view image in the display device 103. The CPU 101 may carry out AE processing on the basis of the evaluation value generated by the image processing circuit 106, and change the moving image shooting conditions set as default values.

Note that a moving image is shot cyclically at an interval corresponding to t_frame0 in order to display the live view at a predetermined frame rate set in advance; then, after the predetermined time t_delay0, the LV data is output to the RAM 120 and displayed. This makes it possible to display the image in synchronization with the display cycle of the display device 103.

In step S103, the CPU 101 confirms whether there is still image data in the RAM 120. It is assumed here that the CPU 101 stores the number of still image shooting commands received from the operating members 102 and manages how many frames' worth of still image data is stored in the RAM 120, but another method may be used instead. For example, a method may be employed in which a register indicating the state of the RAM 120 is provided within the DFE 119, and the CPU 101 reads out values from the register to confirm the state of the RAM 120. If the CPU 101 confirms that there is still image data in the RAM 120, the process moves to step S104, whereas if the CPU 101 cannot confirm that there is still image data in the RAM 120, the process moves to step S107.

In step S104, the CPU 101 sends a still image data request to the shooting control circuit 118. In the present embodiment, the output data rate of the data output circuit 302 is not fast enough to transfer all of one frame's worth of still image data during the period from when the transfer of one frame of LV data ends to when the transfer of the next frame of LV data begins. As such, the still image data is divided into multiple (three, here) pieces, and is transferred in a period when the LV data is not being transferred.

Having received the still image data request from the CPU 101, the shooting control circuit 118 sets, in the data flow control circuit 301, the data size (resolution) and number of divisions of the still image data to be read out, and sends a readout start command. The data flow control circuit 301 determines whether or not the LV data is being read out from the RAM 120, and if the LV data is being read out, stands by until the readout ends. If the LV data is not being read out, the data flow control circuit 301 controls the RAM control circuit 300 so that the still image data is read out. The still image data readout is started at Tc5 in FIG. 10A, Td5 in FIG. 10B, Te5 in FIG. 11A, and Tf7 in FIG. 11B. Then, the data flow control circuit 301 switches the data being read out from the still image data to the LV data at the timing at which the LV data is to be read out from the RAM 120. The divided still image data and the LV data are read out from the RAM 120 in an alternating manner, as indicated by Tc6 and Tc7 in FIG. 10A, Td6 and Tc7 in FIG. 10B, Te6 and Te7 in FIG. 11A, and Tf8 and Tf9 in FIG. 11B. As a result, one frame's worth of still image data can be output from the DFE 119 while maintaining the frame rate of the LV data.

In step S105, the CPU 101 determines whether one frame's worth of still image data has been transferred to the CPU 101. The process moves to step S106 if the data has been transferred, and to step S107 if the data has not been transferred.

In step S106, the CPU 101 transfers one frame's worth of still image data to the image processing circuit 106. The image processing circuit 106 carries out image processing to be applied to the still image data during recording (developing processing, encoding processing, and the like), and records the data into the recording device 108 as a still image data file. Once the recording ends, the CPU 101 moves the process to step S107.

In step S107, the CPU 101 determines whether or not the power switch included in the operating members 102 has been turned off. If the power switch has been turned off, the CPU 101 executes a power cutoff process, and if the power switch has not been turned off, the process returns to step S101.

Figure 9B:
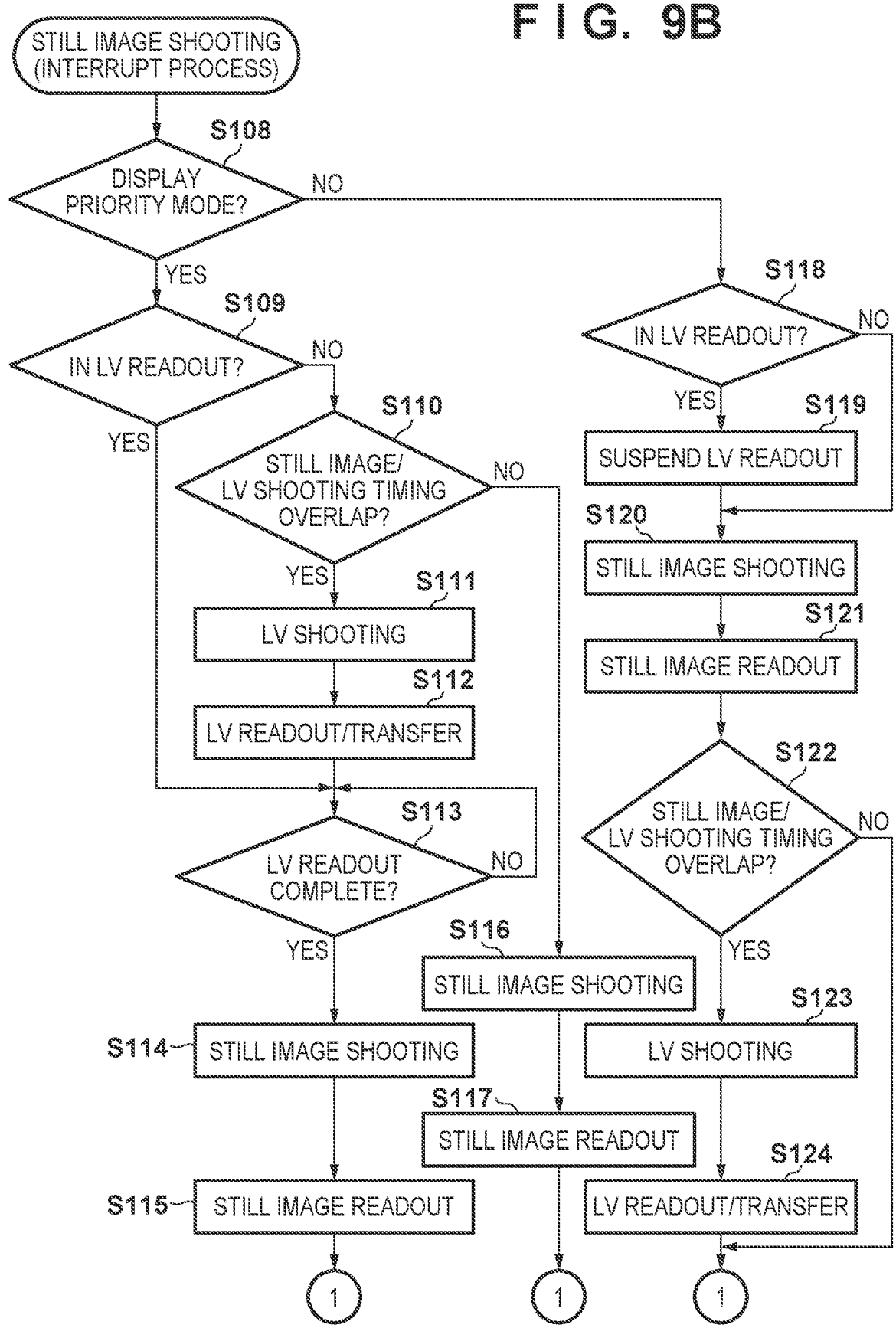
FIG. 9B is a flowchart pertaining to operations of the digital camera according to the first embodiment.

Operations carried out when a still image has been instructed to be shot while steps S100 to S107 are being executed will be described next with reference to the flowchart in FIG. 9B. The instruction to shoot a still image may be made by, for example, operating the shutter button included in the operating members 102. However, the still image shooting may be carried out in response to a touch panel operation or a voice command, or may be carried out automatically on the basis of an image processing result, for example.

When the shutter button is pressed, the CPU 101 starts the still image shooting as an interrupt process. At this time, the CPU 101 can carry out an AE process in accordance with an evaluation value for the moving image frame shot most recently, and determine the shooting conditions to be used when shooting the still image. The digital camera 1000 according to the present embodiment has the display priority mode and the release priority mode as modes pertaining to still image shooting. In step S108, the CPU 101 determines whether or not the display priority mode is set. If the display priority mode is set, the process moves to step S109, and if not, the process moves to step S118.

FIG. 10A is a timing chart illustrating a case where the timings of the output of the still image data from the image sensor 100 and the output of the LV data from the RAM 120 do not overlap in the display priority mode, and FIG. 10B is a timing chart illustrating a case where the stated timings overlap.

Additionally, FIG. 11A is a timing chart illustrating a case where the timings of the output of the still image data from the image sensor 100 and the output of the LV data from the RAM 120 do not overlap in the release priority mode, and FIG. 11B is a timing chart illustrating a case where the stated timings overlap.

In step S109, the CPU 101 determines whether the LV data is being read out from the image sensor 100. If the data is being read out, the process moves to step S113, and if not, the process moves to step S110.

In step S113, the CPU 101 stands by until the readout of the LV data is complete, after which the process moves to step S114.

In step S114, the CPU 101 executes a still image shooting process. Assuming the shutter button has been pressed at Td2 in FIG. 10B, the shooting control circuit 118 sets the shooting conditions for a still image in the image sensor 100 under the control of the CPU 101. Here, the shooting control circuit 118 sets the still image mode, ISO sensitivity, exposure time (accumulation time), and the like in the image sensor 100. Then, at Td3 in FIG. 10B, the shooting control circuit 118 sends a shooting start control signal (a shooting trigger) to the image sensor 100. The pixels in the image sensor 100 start accumulation operations as a result. At this time, the accumulation time is assumed to be Tacc.

In step S115, the shooting control circuit 118 sends a readout control signal (a readout trigger) to the image sensor 100, and the image sensor 100 outputs the still image data (Td4 in FIG. 10B). The RAM control circuit 300 writes the read-out still image data into the RAM 120 under the control of the data flow control circuit 301. After this, the CPU 101 returns the process to step S101.

In this manner, in the display priority mode, if the readout timings (periods) of the still image data and the LV data overlap, the still image is shot after the LV data has been read out. Accordingly, the shooting cycle of the moving image is constant at t_frame0, as indicated in FIG. 10B. Additionally, the LV data from the DFE 119 is also output at the cycle of t_frame0 and displayed in the display device 103. In other words, in the display priority mode, the update cycle of the LV image is also kept constant, and the still image is shot while reducing the delay between the shooting and the display.

If in step S109 the LV data is not being read out, and the still image shooting has been started, in step S110, the CPU 101 determines whether or not the readout period of the still image data and the readout period of the LV data overlap. At this time, the CPU 101 makes the determination taking the exposure time Tacc and the time difference t_delay0 into account. If the CPU 101 determines that the periods overlap, the process moves to step S11, and if not, the process moves to step S116.

In step S111, the shooting control circuit 118 sets the moving image shooting conditions in the image sensor 100 under the control of the CPU 101. The shooting control circuit 118 sets the moving image mode, ISO sensitivity, exposure time, and the like. Furthermore, the shooting control circuit 118 sets, in the data flow control circuit 301, the data size of the LV data, and the time difference t_delay0 until the LV data is read out from the RAM 120 after being written into the RAM 120, under the control of the CPU 101.

In step S112, the image sensor 100 shoots one frame's worth of a moving image under the set shooting conditions. Then, under the control of the CPU 101, the shooting control circuit 118 sends the readout trigger to the image sensor 100 and reads out the LV data from the image sensor 100.

The LV data output from the image sensor 100 is written directly into the RAM 120. Then, on the basis of the settings made in the shooting control circuit 118, the data flow control circuit 301 sends a readout start signal to the RAM control circuit 300 after the predetermined time t_delay0 has passed. The readout of the LV data written into the RAM 120 starts as a result. The LV data read out from the RAM 120 is output to the CPU 101 by the data output circuit 302. The processing from step S113 on is as described above, and thus descriptions thereof will be omitted.

In step S116, the CPU 101 executes the still image shooting process. Assuming the shutter button has been pressed at Tc2 in FIG. 10A, the shooting control circuit 118 sets the shooting conditions for a still image in the image sensor 100 under the control of the CPU 101. Here, the shooting control circuit 118 sets the still image mode, ISO sensitivity, exposure time, and the like. Then, the shooting control circuit 118 sends the shooting trigger to the image sensor 100 after a release time lag t_release0, and the image sensor 100 starts accumulation operations (Tc3 in FIG. 10A). At this time, the accumulation time is Tacc.

In step S117, the shooting control circuit 118 sends the readout trigger to the image sensor 100, and reads out the still image data from the image sensor 100 (Tc4 in FIG. 10A). The RAM control circuit 300 writes the read-out still image data into the RAM 120 under the control of the data flow control circuit 301. After this, the CPU 101 returns the process to step S101.

On the other hand, if the display priority mode is not set (i.e., if the release priority mode is set), in step S118, the CPU 101 determines whether the LV data is being read out from the image sensor 100. The CPU 101 moves the process to step S119 if the LV data is being read out, and to step S120 if the LV data is not being read out.

In step S119, the shooting control circuit 118 suspends the readout of the LV data from the image sensor 100 under the control of the CPU 101. The shooting control circuit 118 sends ending settings and an ending trigger to the image sensor 100. The image sensor 100 then suspends the output of the LV data on the basis of the ending settings and the ending trigger.

In step S120, the CPU 101 shoots a still image. It is assumed that the shutter button has been pressed at Te2 in FIG. 11A and Tf2 in FIG. 11B. The shooting control circuit 118 sets the still image shooting conditions in the image sensor 100 under the control of the CPU 101. Here, the shooting control circuit 118 sets the still image mode, ISO sensitivity, exposure time, and the like. Then, the shooting control circuit 118 sends the shooting trigger to the image sensor 100 after the release time lag t_release0, and the image sensor 100 starts accumulation operations (Te3 in FIG. 11A, Tf3 in FIG. 11B). At this time too, the accumulation time is assumed to be Tacc.

In step S121, the shooting control circuit 118 sends the readout trigger to the image sensor 100 under the control of the CPU 101, and reads out the still image data from the image sensor 100 (Te4 in FIG. 11A, Tf4 in FIG. 11B). The RAM control circuit 300 writes the read-out still image data into the RAM 120 under the control of the data flow control circuit 301.

In step S122, the CPU 101 determines whether or not the readout period of the still image data from the image sensor 100 overlaps with the readout period of the LV data. If the periods overlap, the CPU 101 moves the process to step S123, and if the periods do not overlap, the CPU 101 returns the process to step S101. Here, too, the CPU 101 makes the determination taking the accumulation time Tacc and the time difference t_delay0 into account.

In step S123, the shooting control circuit 118 sets the moving image shooting conditions in the image sensor 100 under the control of the CPU 101. Here, the shooting control circuit 118 sets the moving image mode, ISO sensitivity, exposure time, and the like. Furthermore, the shooting control circuit 118 sets, in the data flow control circuit 301, the data size of the LV data, and the time difference t_delay1 until the LV data is read out from the RAM 120 after being written into the RAM 120, under the control of the CPU 101.

Next, in step S124, the image sensor 100 shoots one frame's worth of a moving image under the set shooting conditions. Then, under the control of the CPU 101, the shooting control circuit 118 sends the readout trigger to the image sensor 100, and the LV data is read out from the image sensor 100.

The data output from the image sensor 100 is written directly into the RAM 120. Then, on the basis of the settings made in the shooting control circuit 118, the data flow control circuit 301 sends a readout start signal to the RAM control circuit 300 after the predetermined time t_delay1 has passed. The LV data written into the RAM 120 is read out as a result. In other words, the LV data written after the still image data written earlier is read out from the RAM 120 first. The LV data read out from the RAM 120 is output from the data output circuit 302 to the CPU 101. The CPU 101 then returns the process to step S101.

The shooting cycle of the LV data is the pre-set t_frame0, with the exception of the frame shot in step S123. As such, the moving image shooting and display are both executed at the cycle corresponding to t_frame0.

If in step S123 the readout period of the still image data and the readout period of the LV data overlap, the moving image is shot after first reading out the still image data. Accordingly, the timing at which the moving image is shot is t_frame1/2, which is different from t_frame0, as illustrated in FIG. 11B. On the other hand, the cycle of the LV data read out from the RAM 120 and output from the DFE 119 is constant at t_frame0, and is used by the display device 103. Such operations are realized because t_delay1 is set to a length which ensures that even if the timing of the moving image shooting has shifted, the timing of the output from the DFE 119 has a constant cycle.

Thus in the release priority mode, the cycle of the live view image display is kept constant while shooting a still image at the constant release time lag t_release0.

According to the image capture apparatus of the present embodiment configured as described above, both moving image shooting for the purpose of live view display and the shooting of a still image can be carried out. Thus even if a still image is shot while shooting a moving image, the frame period of the moving image is kept constant, which eliminates situations where the display is stopped or frames disappear.

Furthermore, providing the display priority mode and the release priority mode make it possible to select a mode in which the periodicity of the LV shooting is prioritized or a mode in which keeping the release time lag constant is prioritized in accordance with the application.

Second Embodiment

A second embodiment of the present invention will be described next. The present embodiment can be realized using almost the same configuration as the digital camera 1000 illustrated in FIG. 1 and described in the first embodiment, and thus descriptions of identical configurations will be omitted.

Figure 12:
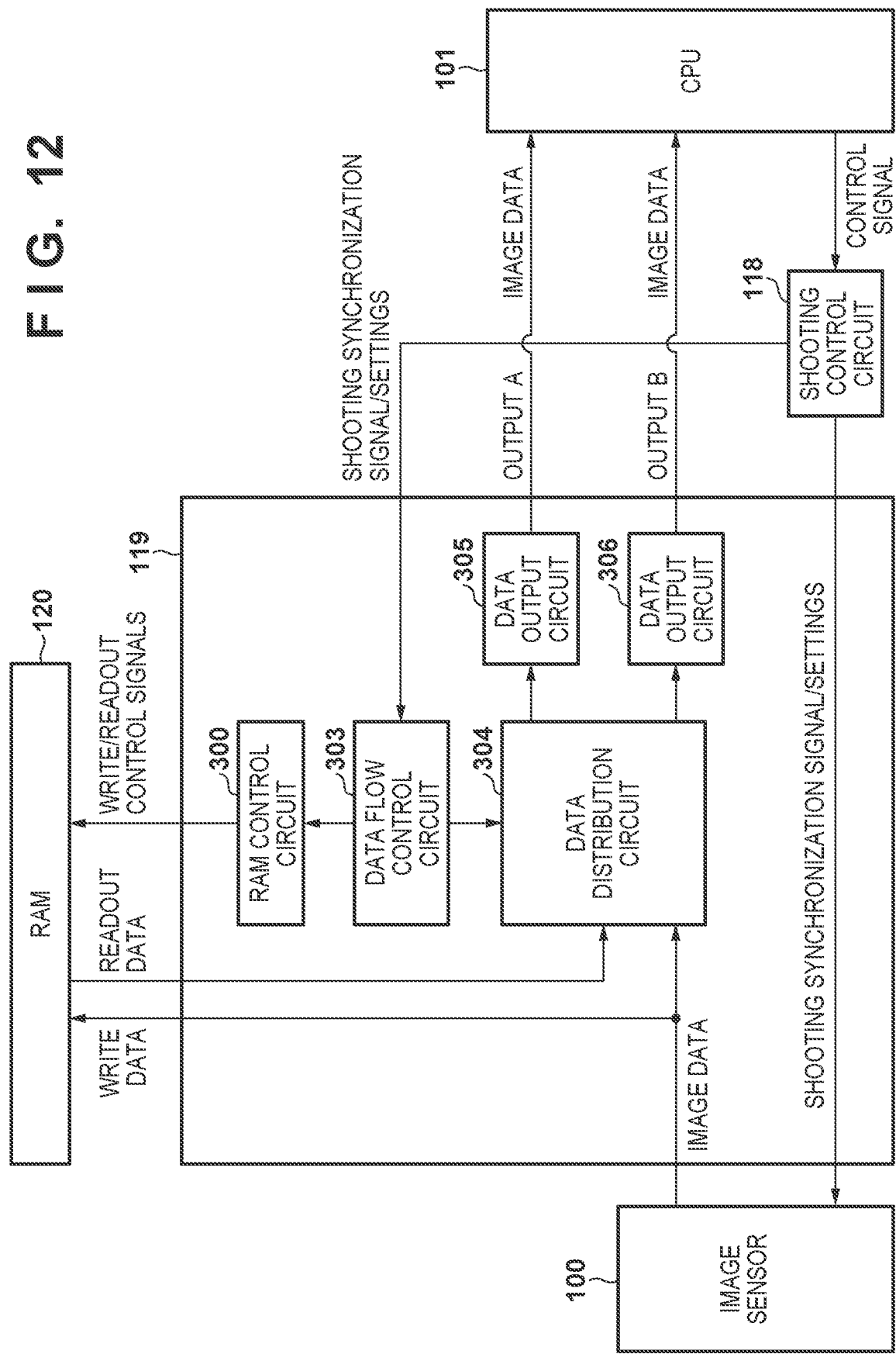
FIG. 12 is a block diagram illustrating an example of the functional configuration of a DFE according to a second embodiment.

As illustrated in FIG. 12, the digital camera 1000 according to the present embodiment differs from that of the first embodiment in terms of the configuration of the DFE 119, and the connection relationship between the DFE 119 and the CPU 101. Note that in FIG. 12, constituent elements that are the same as those illustrated in FIG. 8 and described in the first embodiment are given the same reference signs, and descriptions thereof will be omitted.

The image sensor 100 shoots on the basis of a control signal (shooting synchronization signal) and settings input from the shooting control circuit 118, and reads out and outputs image data. The image data output from the image sensor 100 is input to the DFE 119.

Figure 5C:
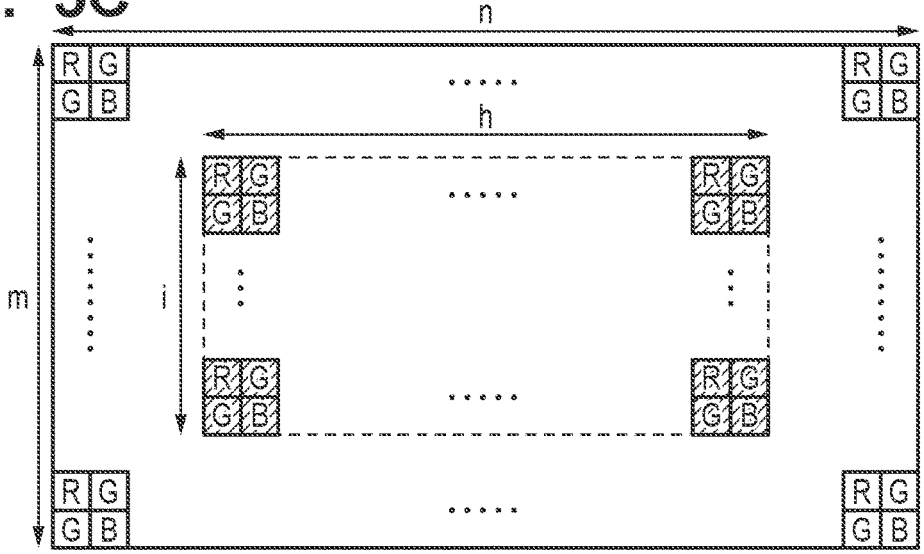
FIG. 5C is a diagram pertaining to readout modes according to embodiments.

The digital camera 1000 according to the present embodiment has the still image mode, the moving image mode (LV mode), and another moving image mode (8K mode). Here, the pixels read out from the image sensor 100 in the still image mode and the moving image mode are the same as in the first embodiment, i.e., are the pixels indicated by hatching in FIGS. 5A and 5B, and will therefore not be described. In the 8K mode, the pixel data is read out from the pixels in a partial region having h horizontal pixels and i vertical pixels, as indicated by the hatched pixels in FIG. 5C. The readout is executed according to the second readout mode during the 8K mode. It is assumed that the resolution (data size) of the pixel region from which data is read out in the 8K mode is lower than in the still image mode but higher than in the moving image mode. Note that the configurations of and readouts in the still image mode, the moving image mode, and the 8K mode are not intended to be limited thereto.

The data flow control circuit 301 sets a write address, data size (resolution), timing, and the like in the RAM control circuit 300, on the basis of the shooting synchronization signal and settings supplied from the shooting control circuit 118. The RAM control circuit 300 carries out write control for the RAM 120 on the basis of the settings, and the image data output from the image sensor 100 is written into the RAM 120.

The data flow control circuit 301 sets a readout address, data size, timing, and the like in the RAM control circuit 300, at a timing that will be described later. The RAM control circuit 300 controls the readout from the RAM 120 on the basis of these settings, and the image data is output from the RAM 120.

A data distribution circuit 304 provided in the DFE 119 according to the present embodiment is input with image data from the image sensor 100 and the RAM 120. The data distribution circuit 304 distributes the image data between two data output circuits 305 and 306 under the control of a data flow control circuit 303.

The image data output from the data distribution circuit 304 to the data output circuits 305 and 306 is input to the CPU 101 by the data output circuits 305 and 306. The data output circuits 305 and 306 transfer the data according to a differential serial transfer method, and each has a plurality of data lanes. The data output circuits 305 and 306 convert the image data supplied from the data distribution circuit 304 into serial data, and transfer the data to the CPU 101 as differential signals. Note that it is not absolutely necessary for the differential serial transfer method to be used.

The following assumes that the image data output from the data output circuit 305 is an output A and the image data output from the data output circuit 306 is an output B.

The digital camera 1000 according to the present embodiment can shoot a still image while shooting a moving image for live view or while shooting an 8K-resolution moving image. The transfer of image data from the DFE 119 to the CPU 101 is such that only the output A is transferred for the LV data, whereas the output A and the output B are transferred separately for the 8K data. Furthermore, the still image data is transferred such that only the output B is transferred while in LV mode, whereas the outputs A and B are transferred separately while in the 8K mode. In the LV mode, the LV data and the still image data are transferred using separate data lanes, and thus the LV data and the still image data can be output in parallel.

Figure 14A:
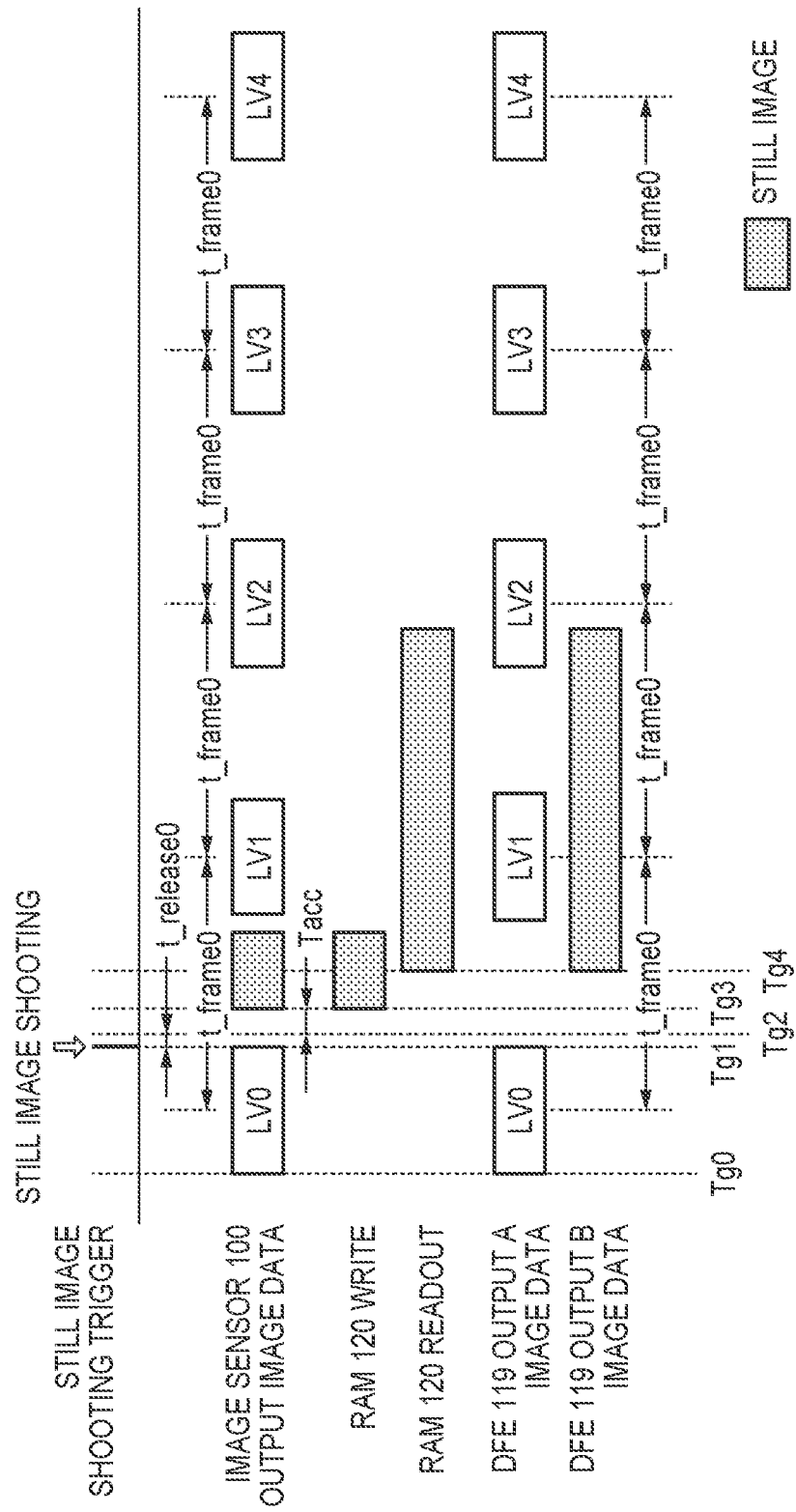
FIG. 14A is a timing chart pertaining to operations of the digital camera according to the second embodiment.
Figure 14B:
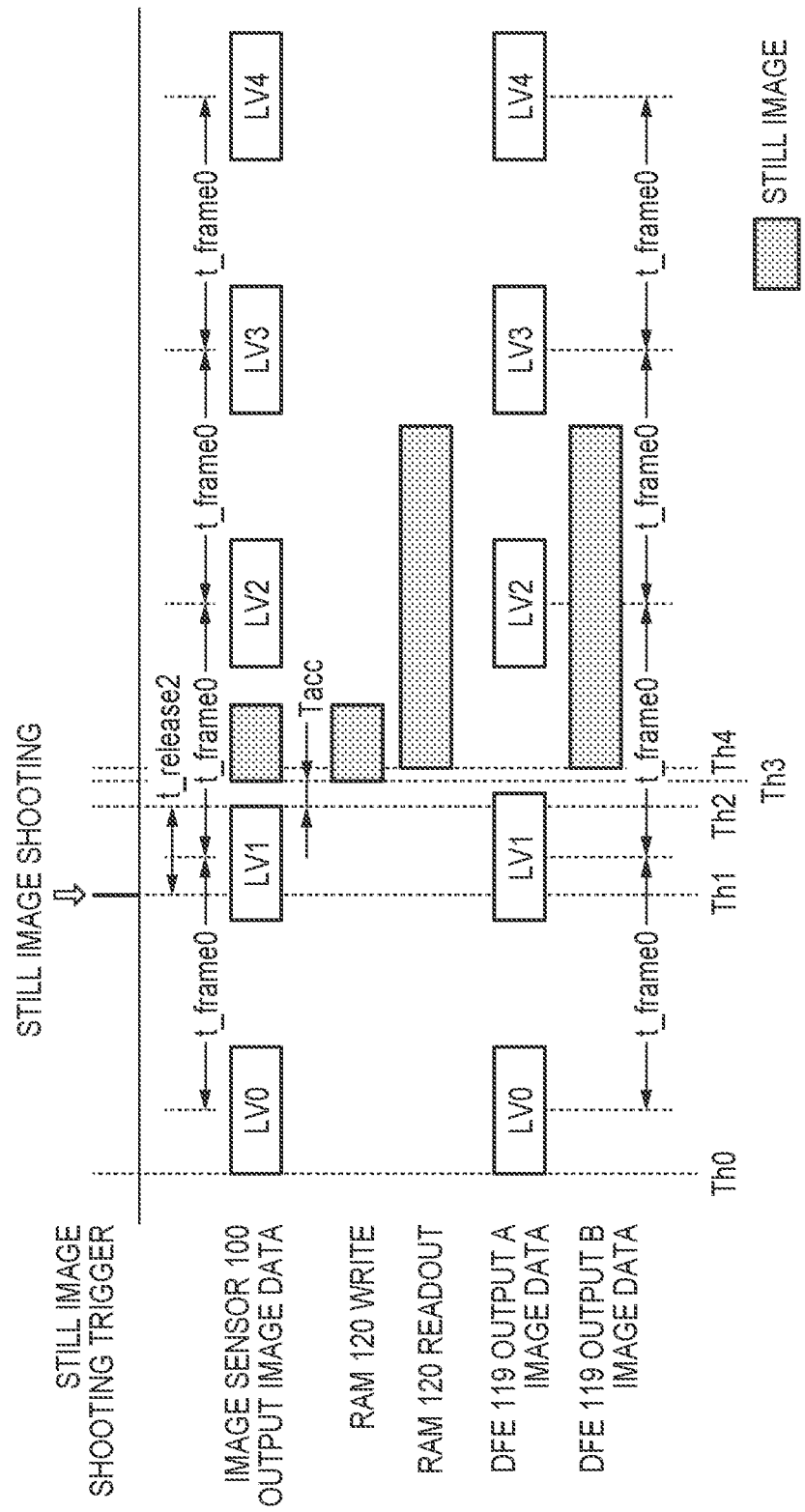
FIG. 14B is a timing chart pertaining to operations of the digital camera according to the second embodiment.
Figure 15A:
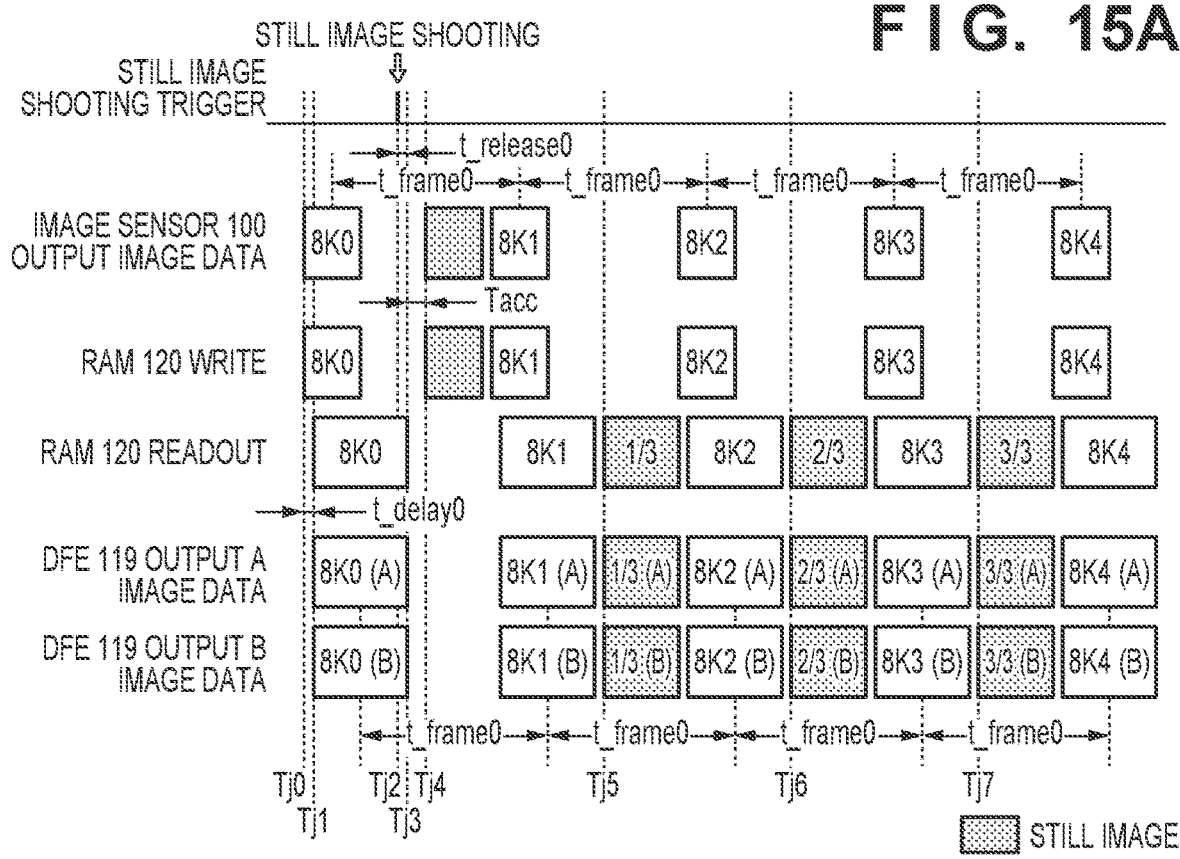
FIG. 15A is a timing chart pertaining to operations of the digital camera according to the second embodiment.
Figure 15B:
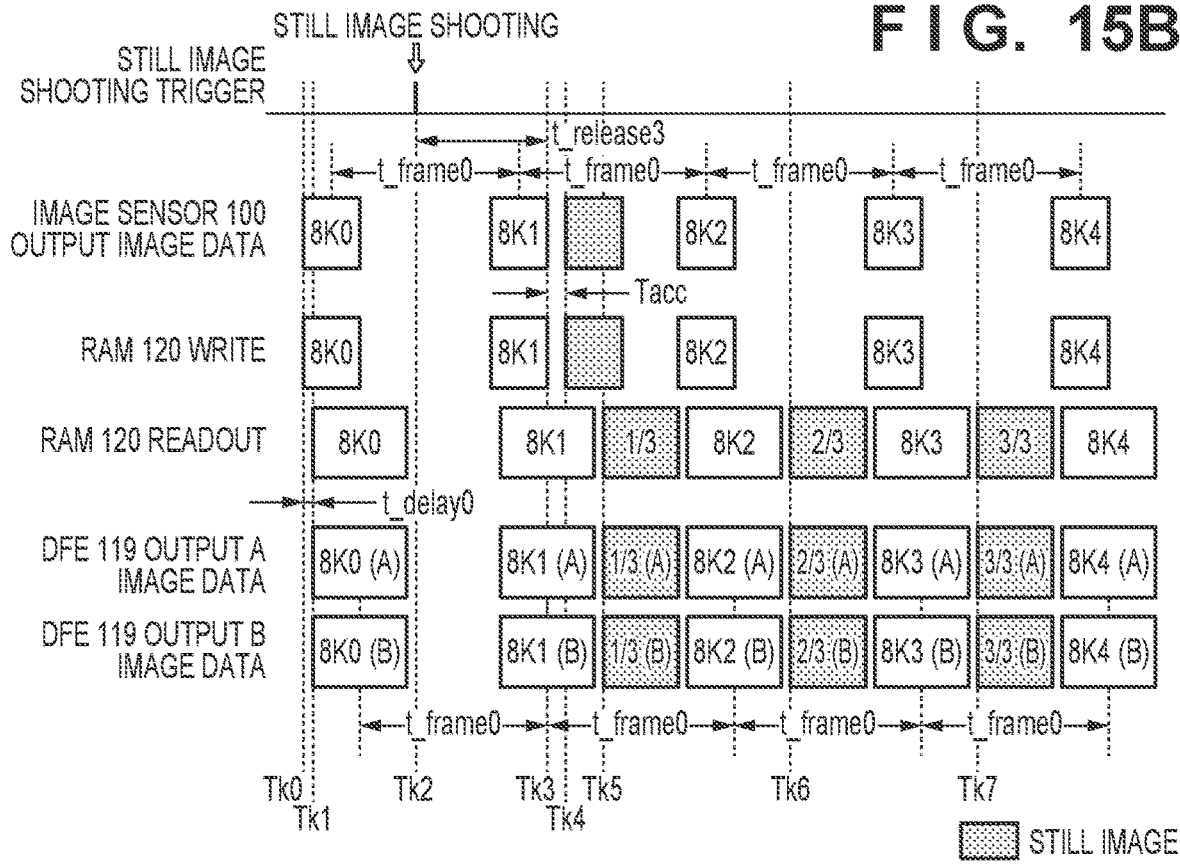
FIG. 15B is a timing chart pertaining to operations of the digital camera according to the second embodiment.

Operations of the digital camera 1000 according to the present embodiment will be described next with reference to FIGS. 13A to 15B. FIGS. 14A to 14C are timing charts for a case where the still image shooting timings are different, when in the LV mode. FIGS. 15A and 15B are timing charts for a case where the still image shooting timings are different, when in the 8K mode.

Figure 13A:
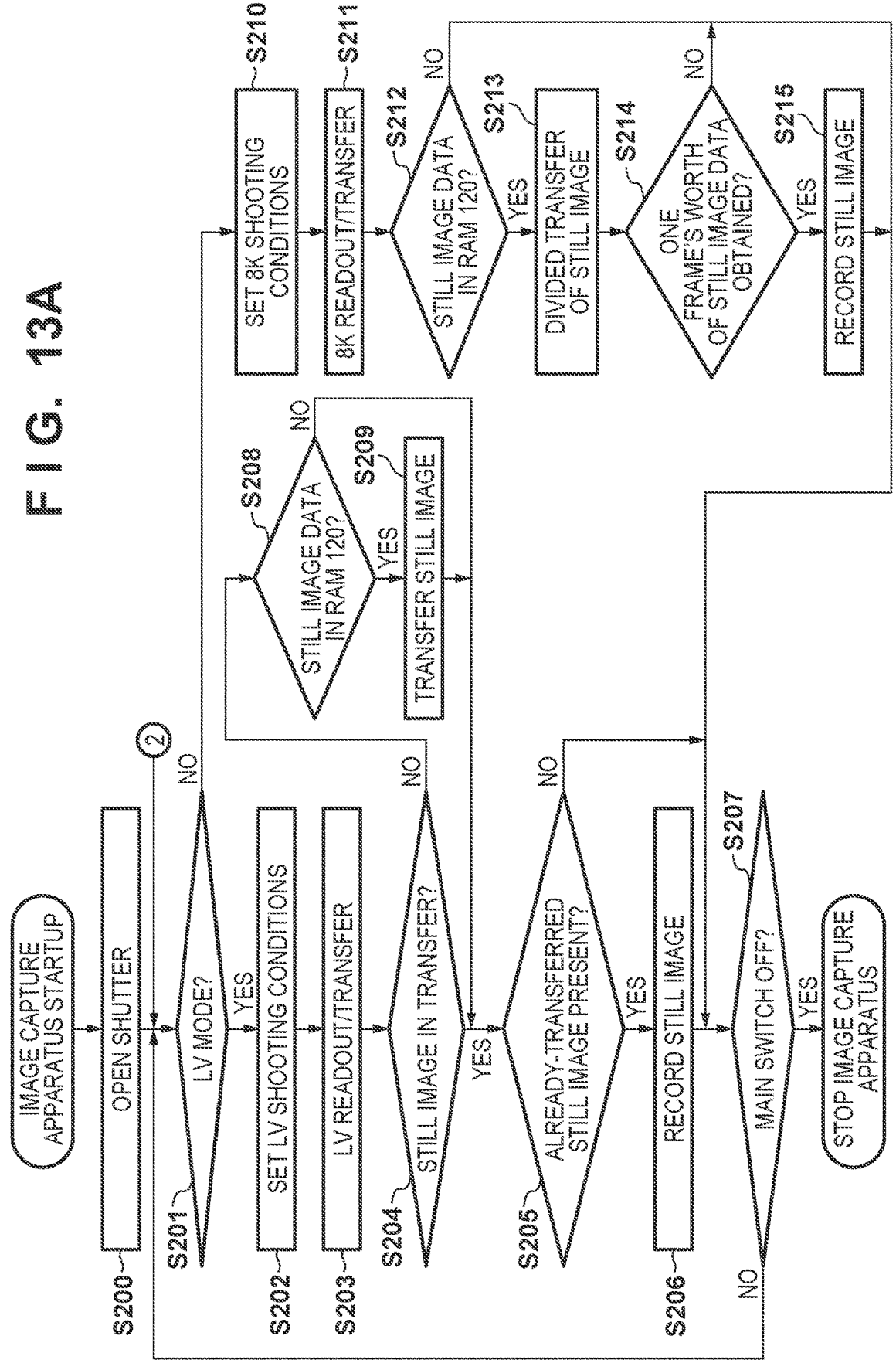
FIG. 13A is a flowchart pertaining to operations of the digital camera according to the second embodiment.

FIG. 13A is a flowchart pertaining to overall operations from startup to stopping. When the user turns the digital camera 1000 on by operating the operating members 102, the CPU 101 executes startup processing such as initialization, and enters a shooting standby state.

In step S200, the CPU 101 opens the focal plane shutter 109 and puts the image sensor 100 in an exposed state in order to display a live view while in the shooting standby state.

In step S201, the CPU 101 determines whether the pre-set moving image mode is the LV mode or the 8K mode. The process moves to step S202 if the mode is the LV mode, and to step S210 if the mode is the 8K mode.

In step S202, the shooting control circuit 118 sets the live view shooting conditions in the image sensor 100 under the control of the CPU 101. Here, the shooting control circuit 118 sets the LV mode, ISO sensitivity, exposure time, and the like. Furthermore, the shooting control circuit 118 sets the data size of the LV data in the data flow control circuit 303, under the control of the CPU 101.

In step S203, the image sensor 100 shoots one frame's worth of a moving image under the set shooting conditions. When the shooting is carried out, the LV data LV0 of the 0th frame is output from the image sensor 100, as indicated by Tg0 in FIG. 14A, Th0 in FIG. 14B, and Ti0 in FIG. 14C. At this time, the time of the readout from the image sensor 100 is adjusted in accordance with the data rate at which the LV data is output from the DFE 119. As a result, the LV data can be output from the DFE 119 without using a buffer such as the RAM 120 within the DFE 119. Although the present embodiment describes a configuration in which the LV data is not stored in a buffer such as the RAM 120, the configuration may be such that the LV data is output after being temporarily stored in a buffer.

The image data output from the image sensor 100 is input to the data distribution circuit 304. On the basis of the settings made in the shooting control circuit 118, the data flow control circuit 303 sets the data distribution circuit 304 to output the image data input from the image sensor 100 to the data output circuit 305. As a result, the image data for live view display is output to the CPU 101 from the output A of the DFE 119.

The LV data output to the CPU 101 is transferred to the image processing circuit 106 by the CPU 101. The image processing circuit 106 carries out predetermined image processing on the LV data, and displays the resulting data as a live view image in the display device 103.

Here, the moving image shooting in the LV mode is carried out cyclically at an interval corresponding to t_frame0 in order to achieve a pre-set frame rate, and the LV data is displayed at the same cycle. This makes it possible to display the LV image in synchronization with the display cycle of the display device 103.

In step S204, the CPU 101 determines whether or not still image data is being transferred from the DFE 119 to the CPU 101. The process moves to step S208 if the data is not being transferred, and to step S205 if the data is being transferred.

In step S208, the CPU 101 confirms whether there is still image data in the RAM 120. It is assumed here that the CPU 101 stores the number of still image shooting commands received from the operating members 102 and manages how many frames' worth of still image data is stored in the RAM 120, but another method may be used instead. For example, a method may be employed in which a register indicating the state of the RAM 120 is provided within the DFE 119, and the CPU 101 reads out values from the register to confirm the state of the RAM 120. If the CPU 101 confirms that there is still image data in the RAM 120, the process moves to step S209, whereas if the CPU 101 cannot confirm that there is still image data in the RAM 120, the process moves to step S205.

In step S209, the DFE 119 starts the transfer of the still image data to the CPU 101. Having received the still image data request from the CPU 101, the shooting control circuit 118 sets, in the data flow control circuit 303, the data size (resolution) of the still image data to be read out, and sends a readout start command. The data flow control circuit 303 controls the RAM control circuit 300 to read out the still image data, as indicated by Tg4 in FIG. 14A, Th4 in FIG. 14B, and Ti4 in FIG. 14C. At this time, the data flow control circuit 301 sets the data distribution circuit 304 so that the still image data read out from the RAM 120 is output to the data output circuit 306. As a result, the still image data is output through the data output circuit 306 to the CPU 101 as the output B. In the present embodiment, the data rate of the data output circuit 306 is lower than the output rate of the image sensor 100, and the amount of time required to transfer the still image data from the DFE 119 to the CPU 101 is longer than the amount of time required to transfer the still image data from the image sensor 100 to the DFE 119. However, this data rate relationship is not absolutely necessary.

In step S205, the CPU 101 determines whether one frame's worth of still image data has been transferred to the CPU 101. The process moves to step S206 if the data has been transferred, and to step S207 if the data has not been transferred.

In step S206, the CPU 101 transfers one frame's worth of still image data to the image processing circuit 106. The image processing circuit 106 carries out image processing to be applied to the still image data during recording (developing processing, encoding processing, and the like), and records the data into the recording device 108 as a still image data file. Once the recording ends, the CPU 101 moves the process to step S207.

In step S207, the CPU 101 determines whether or not the power switch included in the operating members 102 has been turned off. If the power switch has been turned off, the CPU 101 executes a power cutoff process, and if the power switch has not been turned off, the process returns to step S201.

On the other hand, if the 8K mode is selected, in step S210, the shooting control circuit 118 sets the shooting conditions in the image sensor 100 under the control of the CPU 101. Here, the shooting control circuit 118 sets the 8K mode, ISO sensitivity, exposure time, and the like in the image sensor 100. Furthermore, the shooting control circuit 118 sets, in the data flow control circuit 301, the data size, and the time difference t_delay0 until the 8K data is read out from the RAM 120 after being written into the RAM 120, under the control of the CPU 101.

In step S211, the image sensor 100 shoots one frame's worth of an 8K moving image under the set shooting conditions. Then, 8K moving image data 8K0 from the 0th frame is output from the image sensor 100, as indicated by Tj0 in FIG. 15A and Tk0 in FIG. 15B.

The image data output from the image sensor 100 is written directly into the RAM 120. Then, on the basis of the settings made in the shooting control circuit 118, the data flow control circuit 303 sends a readout start signal to the RAM control circuit 300 after the predetermined time t_delay0 has passed. The image data written into the RAM 120 is read out as a result (Tj1 in FIG. 15A and Tk1 in FIG. 15B).

On the basis of the settings made in the shooting control circuit 118, the data flow control circuit 303 sets the data distribution circuit 304 to output the 8K moving image data input from the image sensor 100 to the data output circuits 305 and 306. In accordance with this setting, the data distribution circuit 304 divides the 8K moving image data read out from the RAM 120 into two parts, i.e., 8K0(A) and 8K0(B), and outputs those parts to the data output circuits 305 and 306, respectively. The divided 8K moving image data is then output to the CPU 101 through the data output circuits 305 and 306.

In step S212, the CPU 101 confirms whether there is still image data in the RAM 120, in the same manner as in step S208. If the CPU 101 confirms that there is still image data in the RAM 120, the process moves to step S213, whereas if the CPU 101 cannot confirm that there is still image data in the RAM 120, the process moves to step S207.

In S213, the CPU 101 sends a still image data request to the shooting control circuit 118. In the present embodiment, the output data rates of the data output circuits 305 and 306 are not fast enough to transfer all of one frame's worth of still image data during the period from when the transfer of one frame of 8K moving image data ends to when the transfer of the next frame of 8K moving image data begins. As such, the still image data is divided into multiple (three, here) pieces, and is transferred in a period when the 8K moving image data is not being transferred.

Having received the still image request from the CPU 101, the shooting control circuit 118 sets, in the data flow control circuit 303, the data size (resolution) and number of divisions of the still image data to be read out, and sends a readout start command. The data flow control circuit 303 determines whether or not the 8K moving image data is being read out from the RAM 120, and if the 8K moving image data is being read out, stands by until the readout ends. If the 8K moving image data is not being read out, the data flow control circuit 303 controls the RAM control circuit 300 so that the still image data is read out, as indicated by Tj5 in FIG. 15A and Tk5 in FIG. 15B. Then, the data flow control circuit 303 switches the data being read out from the still image data to the 8K moving image data at the timing at which the 8K moving image data is to be read out from the RAM 120. The divided still image data and the 8K moving image data are read out from the RAM 120 in an alternating manner, as indicated by Tj6 and Tj7 in FIG. 15A and Tk6 and Tk7 in FIG. 15B. As a result, one frame's worth of the still image data can be output to the CPU 101 through the data output circuits 305 and 306, as the output A and the output B, while maintaining the frame rate of the 8K moving image data.

In step S214, the CPU 101 determines whether one frame's worth of still image data has been transferred to the CPU 101. The process moves to step S215 if the data has been transferred, and to step S207 if the data has not been transferred.

In step S215, the CPU 101 transfers one frame's worth of still image data to the image processing circuit 106. The image processing circuit 106 carries out image processing to be applied to the still image data during recording (developing processing, encoding processing, and the like), and records the data into the recording device 108 as a still image data file. Once the recording ends, the CPU 101 moves the process to step S207.

Operations carried out when a still image has been instructed to be shot while steps S200 to S215 are being executed will be described next. The instruction to shoot a still image may be made by, for example, operating the shutter button included in the operating members 102.

When the shutter button is pressed, the CPU 101 starts the still image shooting as an interrupt process. At this time, the CPU 101 can carry out an AE process in accordance with an evaluation value for the moving image frame shot most recently, and determine the shooting conditions to be used when shooting the still image.

Figures 1, 13B:
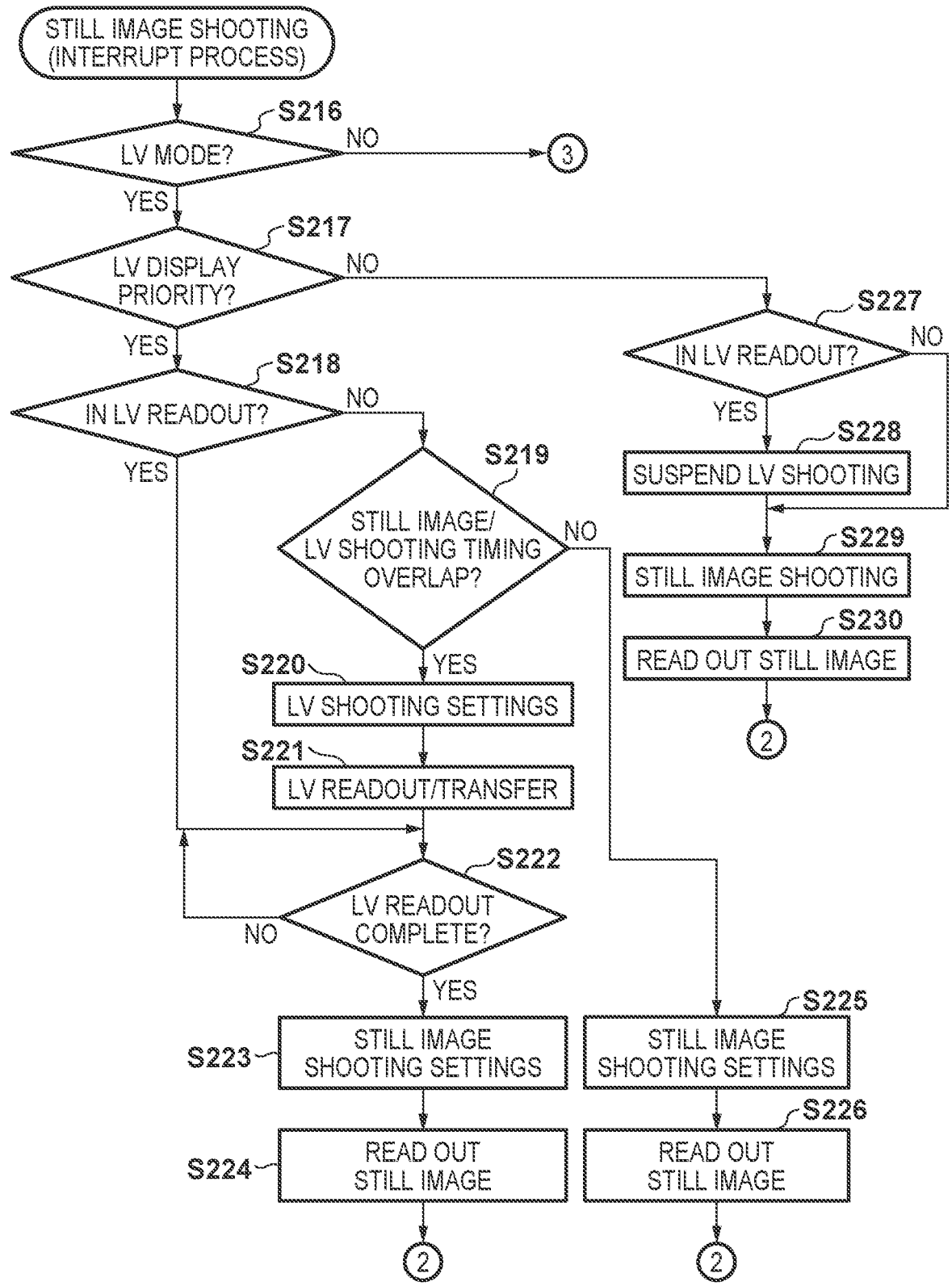
Figures 2, 13B:
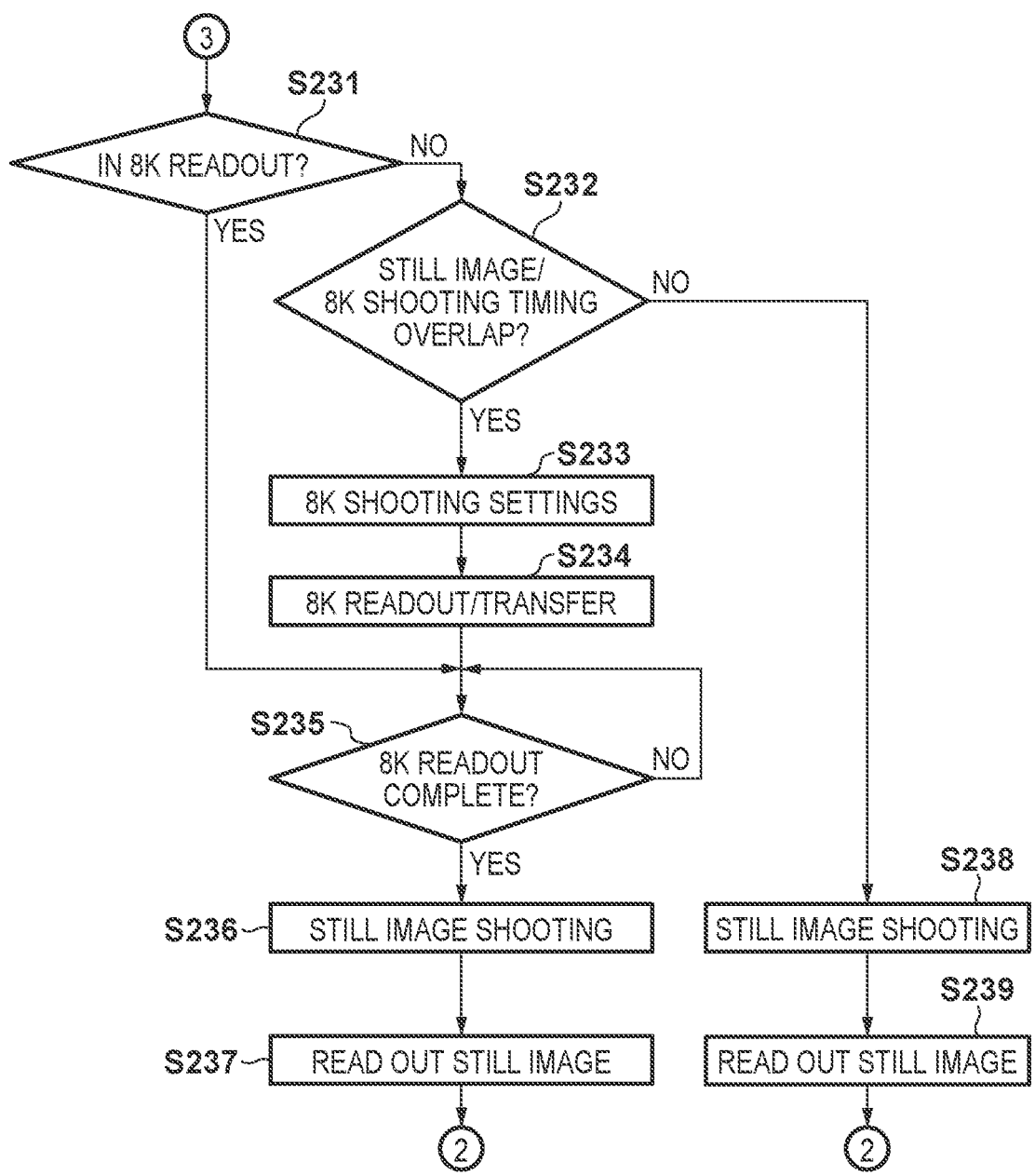

The still image shooting operations will be described with reference to the flowcharts in FIGS. 13B-1 and 13B-2. In step S216, the CPU 101 determines whether or not the moving image shooting currently underway is being carried out in the LV mode. If the mode is the LV mode, the process moves to step S217, and if the mode is not the LV mode (i.e., is the 8K mode), the process moves to step S231.

As in the first embodiment, the digital camera 1000 according to the present embodiment has the display priority mode and the release priority mode as modes pertaining to still image shooting. In step S217, the CPU 101 determines whether or not the display priority mode is set. If the display priority mode is set, the process moves to step S209, and if not (i.e., if the release priority mode is set), the process moves to step S218.

FIG. 14A is a timing chart illustrating a case where the timings of the output of the still image data from the image sensor 100 and the output of the LV data from the RAM 120 do not overlap in the display priority mode, and FIG. 14B is a timing chart illustrating a case where the stated timings overlap.

Additionally, FIG. 14C is a timing chart illustrating a case where the timings of the output of the still image data from the image sensor 100 and the output of the LV data from the RAM 120 overlap in the release priority mode.

In step S218, the CPU 101 determines whether the LV data is being read out from the image sensor 100. If the data is being read out, the process moves to step S222, and if not, the process moves to step S219.

In step S222, the CPU 101 stands by until the readout of the LV data is complete, after which the process moves to step S223.

In step S223, the CPU 101 executes a still image shooting process. Assuming the shutter button has been pressed at Th1 in FIG. 14B, the shooting control circuit 118 sets the shooting conditions for a still image in the image sensor 100 under the control of the CPU 101. Here, the shooting control circuit 118 sets the still image mode, ISO sensitivity, exposure time (accumulation time), and the like in the image sensor 100. Then, at Th2 in FIG. 14B, the shooting control circuit 118 sends a shooting start control signal (a shooting trigger) to the image sensor 100. The pixels in the image sensor 100 start accumulation operations as a result. At this time, the accumulation time is assumed to be Tacc.

In step S224, the shooting control circuit 118 sends a readout control signal (a readout trigger) to the image sensor 100, and the image sensor 100 outputs the still image data (Th3 in FIG. 14B). The RAM control circuit 300 writes the read-out still image data into the RAM 120 under the control of the data flow control circuit 303. After this, the CPU 101 returns the process to step S201.

In this manner, in the display priority mode, if the readout timings (periods) of the still image data and the LV data overlap, the still image is shot after the LV data has been read out. Accordingly, the shooting cycle of the moving image is constant at t_frame0, as indicated in FIG. 14B. Additionally, the LV data from the DFE 119 is also output at the cycle of t_frame0 and displayed in the display device 103. In other words, in the display priority mode, the update cycle of the LV image is also kept constant, and the still image is shot while reducing the delay between the shooting and the display.

If in step S218 the LV data is not being read out, and the still image shooting has been started, in step S219, the CPU 101 determines whether or not the readout period of the still image data and the readout period of the LV data overlap. At this time, the CPU 101 makes the determination taking the exposure time Tacc and the time difference t_delay0 into account. If the CPU 101 determines that the periods overlap, the process moves to step S220, and if not, the process moves to step S225.

In step S220, the shooting control circuit 118 sets the LV shooting conditions in the image sensor 100 under the control of the CPU 101. The shooting control circuit 118 sets the moving image mode, ISO sensitivity, exposure time, and the like. Furthermore, the shooting control circuit 118 sets the data size of the LV data in the data flow control circuit 303, under the control of the CPU 101.

In step S221, the image sensor 100 shoots one frame's worth of a moving image under the set shooting conditions. Then, under the control of the CPU 101, the shooting control circuit 118 sends the readout trigger to the image sensor 100 and reads out the LV data from the image sensor 100.

The LV data output from the image sensor 100 is input directly to the data distribution circuit 304. Then, on the basis of the settings made in the shooting control circuit 118, the data flow control circuit 303 sets the data distribution circuit 304 to output the LV data input from the image sensor 100 to be output to the data output circuit 305. As a result, the LV data is output to the CPU 101 from the data output circuit 305 as the output A from the DFE 119. The CPU 101 then moves the process to step S222.

On the other hand, in step S225, the CPU 101 executes the still image shooting process. Assuming the shutter button has been pressed at Tg1 in FIG. 14A, the shooting control circuit 118 sets the shooting conditions for a still image in the image sensor 100 under the control of the CPU 101. Here, the shooting control circuit 118 sets the still image mode, ISO sensitivity, exposure time, and the like. Then, the shooting control circuit 118 sends the shooting trigger to the image sensor 100 after a release time lag t_release0, and the image sensor 100 starts accumulation operations (Tg2 in FIG. 14A). At this time, the accumulation time is Tacc.

In step S226, the shooting control circuit 118 sends the readout trigger to the image sensor 100, and reads out the still image data from the image sensor 100 (Tg3 in FIG. 14A). The RAM control circuit 300 writes the read-out still image data into the RAM 120 under the control of the data flow control circuit 303. After this, the CPU 101 returns the process to step S201.

On the other hand, if the display priority mode is not set (i.e., if the release priority mode is set), in step S227, the CPU 101 determines whether the LV data is being read out from the image sensor 100. The CPU 101 moves the process to step S229 if the LV data is being read out, and to step S228 if the LV data is not being read out.

In step S228, the shooting control circuit 118 suspends the readout of the LV data from the image sensor 100 under the control of the CPU 101. The shooting control circuit 118 sends ending settings and an ending trigger to the image sensor 100. The image sensor 100 then suspends the output of the LV data on the basis of the ending settings and the ending trigger. The frame in which the readout was suspended is not displayed. The CPU 101 then moves the process to step S229.

In step S229, the CPU 101 shoots a still image. It is assumed that the shutter button has been pressed at Ti1 in FIG. 14C. The shooting control circuit 118 sets the still image shooting conditions in the image sensor 100 under the control of the CPU 101. Here, the shooting control circuit 118 sets the still image mode, ISO sensitivity, exposure time, and the like. Then, the shooting control circuit 118 sends the shooting trigger to the image sensor 100 after a release time lag t_release0, and the image sensor 100 starts accumulation operations (Ti2 in FIG. 14C). At this time too, the accumulation time is assumed to be Tacc.

In step S230, the shooting control circuit 118 sends the readout trigger to the image sensor 100 under the control of the CPU 101, and reads out the still image data from the image sensor 100 (Ti3 in FIG. 14C). The RAM control circuit 300 writes the read-out still image data into the RAM 120 under the control of the data flow control circuit 303. The CPU 101 returns the process to step S201 once the writing has ended.

Operations for shooting a still image during the 8K mode will be described next.

In step S231, the CPU 101 determines whether the 8K data is being read out from the image sensor 100. If the data is being read out, the process moves to step S235, and if not, the process moves to step S232.

In step S235, the CPU 101 stands by until the readout of the 8K data is complete, after which the process moves to step S236.

In step S236, the CPU 101 executes a still image shooting process. The shooting control circuit 118 sets the still image shooting conditions in the image sensor 100 under the control of the CPU 101. Here, the shooting control circuit 118 sets the still image mode, ISO sensitivity, exposure time (accumulation time), and the like in the image sensor 100. Then, the shooting control circuit 118 sends a shooting start control signal (a shooting trigger) to the image sensor 100. The pixels in the image sensor 100 start accumulation operations as a result.

In step S237, the shooting control circuit 118 sends a readout control signal (a readout trigger) to the image sensor 100, and the image sensor 100 outputs the still image data. The RAM control circuit 300 writes the read-out still image data into the RAM 120 under the control of the data flow control circuit 303. After this, the CPU 101 returns the process to step S201.

In this manner, in the 8K mode, if the readout timings (periods) of the still image data and the 8K data overlap, the still image is shot after the 8K data has been read out. The shooting cycle of the moving image is therefore constant. The 8K data from the DFE 119 is also output at a constant cycle, and is recorded into the recording device 108 as a moving image data file after the image processing circuit 106 carries out image processing for recording thereon. The image processing circuit 106 also generates the LV data from the 8K data. The CPU 101 displays the LV data in the display device 103. After this, the CPU 101 returns the process to step S201.

If in step S231 the 8K data is not being read out, and the still image shooting has been started, in step S232, the CPU 101 determines whether or not the readout period of the still image data and the readout period of the 8K data overlap. At this time, the CPU 101 makes the determination taking the exposure time Tacc and the time difference t_delay0 into account. If the CPU 101 determines that the periods overlap, the process moves to step S233, and if not, the process moves to step S238.

In step S233, the shooting control circuit 118 sets the 8K shooting conditions in the image sensor 100 under the control of the CPU 101. The shooting control circuit 118 sets the 8K mode, ISO sensitivity, exposure time, and the like. Furthermore, the shooting control circuit 118 sets the data size of the 8K data in the data flow control circuit 303, under the control of the CPU 101.

In step S234, the image sensor 100 shoots one frame's worth of a moving image under the set shooting conditions. Then, under the control of the CPU 101, the shooting control circuit 118 sends the readout trigger to the image sensor 100 and reads out the 8K data from the image sensor 100.

The 8K data output from the image sensor 100 is input directly to the data distribution circuit 304. Then, on the basis of the settings made in the shooting control circuit 118, the data flow control circuit 303 sets the data distribution circuit 304 to output the 8K data input from the image sensor 100 to be output to the data output circuit 305. As a result, the 8K data is output to the CPU 101 from the data output circuit 305 as the output A from the DFE 119. The CPU 101 then moves the process to step S235.

Once the readout of the 8K data is confirmed as being complete in step S235, in step S236, the CPU 101 executes a still image shooting process. Assuming the shutter button has been pressed at Tk2 in FIG. 15B, the shooting control circuit 118 sets the shooting conditions for a still image in the image sensor 100 under the control of the CPU 101. Here, the shooting control circuit 118 sets the still image mode, ISO sensitivity, exposure time (accumulation time), and the like in the image sensor 100. Then, after a release time lag t_release3, the shooting control circuit 118 sends a shooting start control signal (a shooting trigger) to the image sensor 100 (Tk3 in FIG. 15A). The pixels in the image sensor 100 start accumulation operations as a result. At this time, the accumulation time is assumed to be Tacc.

In step S237, the shooting control circuit 118 sends a readout control signal (a readout trigger) to the image sensor 100, and the image sensor 100 outputs the still image data (Tk4 in FIG. 15B). The RAM control circuit 300 writes the read-out still image data into the RAM 120 under the control of the data flow control circuit 303. After this, the CPU 101 returns the process to step S201.

In this manner, in the 8K mode, if the readout timings (periods) of the still image data and the 8K data overlap, the still image is shot after the 8K data has been read out. Accordingly, the shooting cycle of the moving image is constant at t_frame0, as indicated in FIG. 15B. The 8K data from the DFE 119 is also output at a cycle corresponding to t_frame0, and is recorded into the recording device 108 as a moving image data file after the image processing circuit 106 carries out image processing for recording thereon. The image processing circuit 106 also generates the LV data from the 8K data. The CPU 101 displays the LV data in the display device 103. After this, the CPU 101 returns the process to step S201.

If in step S232 the timing of the readout of the still image data from the image sensor 100 does not overlap with the timing of the readout of the 8K data, in step S238, the CPU 101 executes the still image shooting process. Assuming the shutter button has been pressed at Tj2 in FIG. 15A, the shooting control circuit 118 sets the shooting conditions for a still image in the image sensor 100 under the control of the CPU 101. Here, the shooting control circuit 118 sets the still image mode, ISO sensitivity, exposure time, and the like. Then, the shooting control circuit 118 sends the shooting trigger to the image sensor 100 after a release time lag t_release0, and the image sensor 100 starts accumulation operations (Tj3 in FIG. 15A). At this time, the accumulation time is Tacc.

In step S239, the shooting control circuit 118 sends the readout trigger to the image sensor 100, and reads out the still image data from the image sensor 100 (Tj4 in FIG. 15A). The RAM control circuit 300 writes the read-out still image data into the RAM 120 under the control of the data flow control circuit 303. After this, the CPU 101 returns the process to step S201.

According to the present embodiment as well, even if a still image is shot while shooting a moving image for the purpose of live view display, the frame period of the live view display is kept constant, which eliminates situations where the display is stopped or frames disappear, in the same manner as in the first embodiment. Furthermore, the same effect can be achieved even when shooting a still image while shooting a moving image for the purpose of recording an 8K moving image.

Third Embodiment

A third embodiment of the present invention will be described next. The present embodiment can be realized using almost the same configuration as the digital camera 1000 illustrated in FIG. 1 and described in the first embodiment, and thus descriptions of identical configurations will be omitted.

Figure 16:
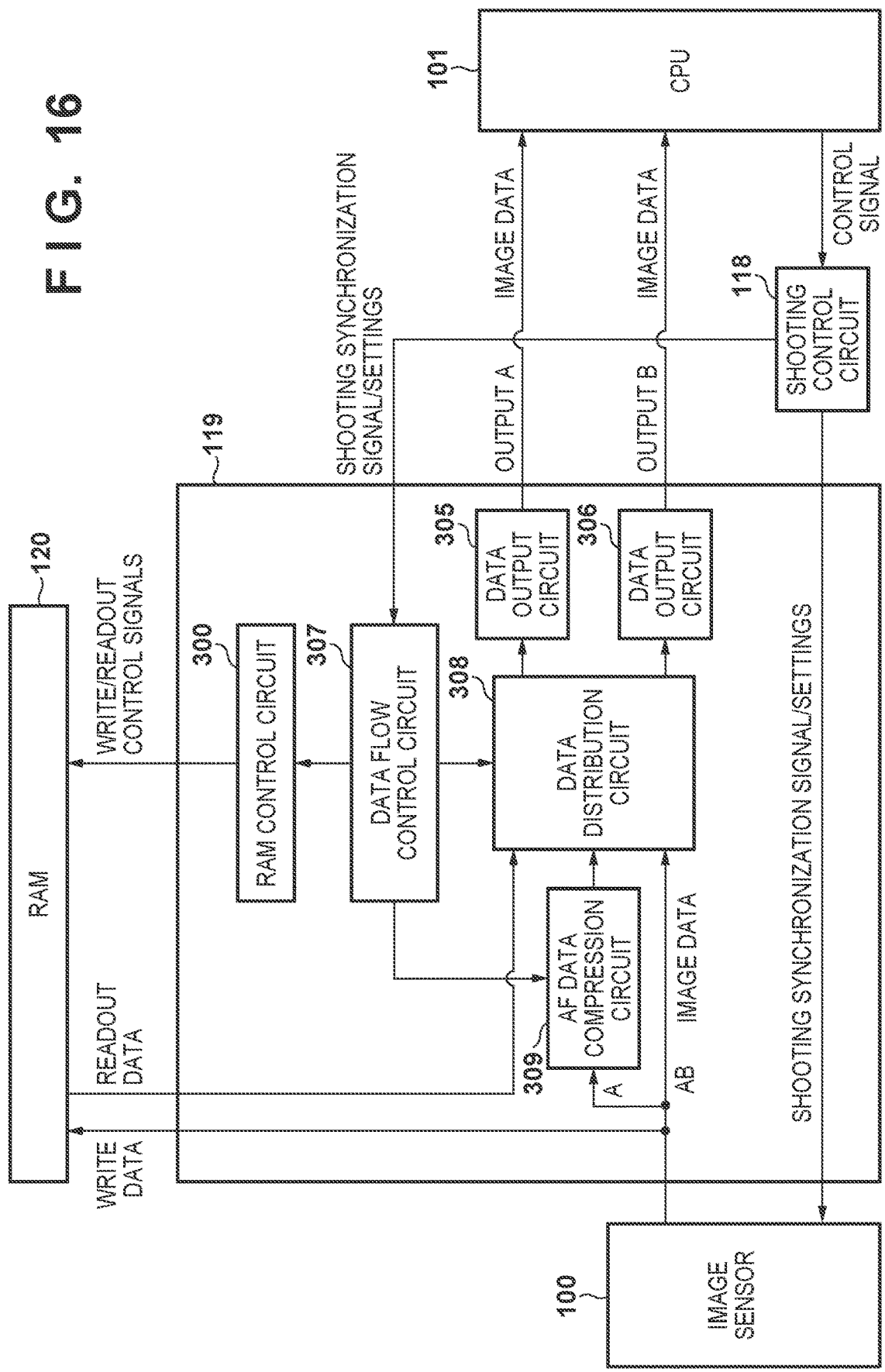
FIG. 16 is a block diagram illustrating an example of the functional configuration of a DFE according to a third embodiment.

As illustrated in FIG. 16, the digital camera 1000 according to the present embodiment differs from that of the second embodiment in terms of the configuration of the DFE 119. Note that in FIG. 16, constituent elements that are the same as those illustrated in FIG. 12 and described in the second embodiment are given the same reference signs, and descriptions thereof will be omitted.

The DFE 119 according to the present embodiment includes an AF data compression circuit 309. The AF data compression circuit 309 is input with image data read out from the RAM 120. The output of the AF data compression circuit 309 is input to a data distribution circuit 308. In addition to the functions of the data distribution circuit 304 according to the second embodiment, the data distribution circuit 308 has a function for outputting the output of the AF data compression circuit 309 to the data output circuit 306. Although the AF data compression circuit 309 need not be provided, providing that circuit makes it possible to expand the period in which still image data can be output.

Figure 17:
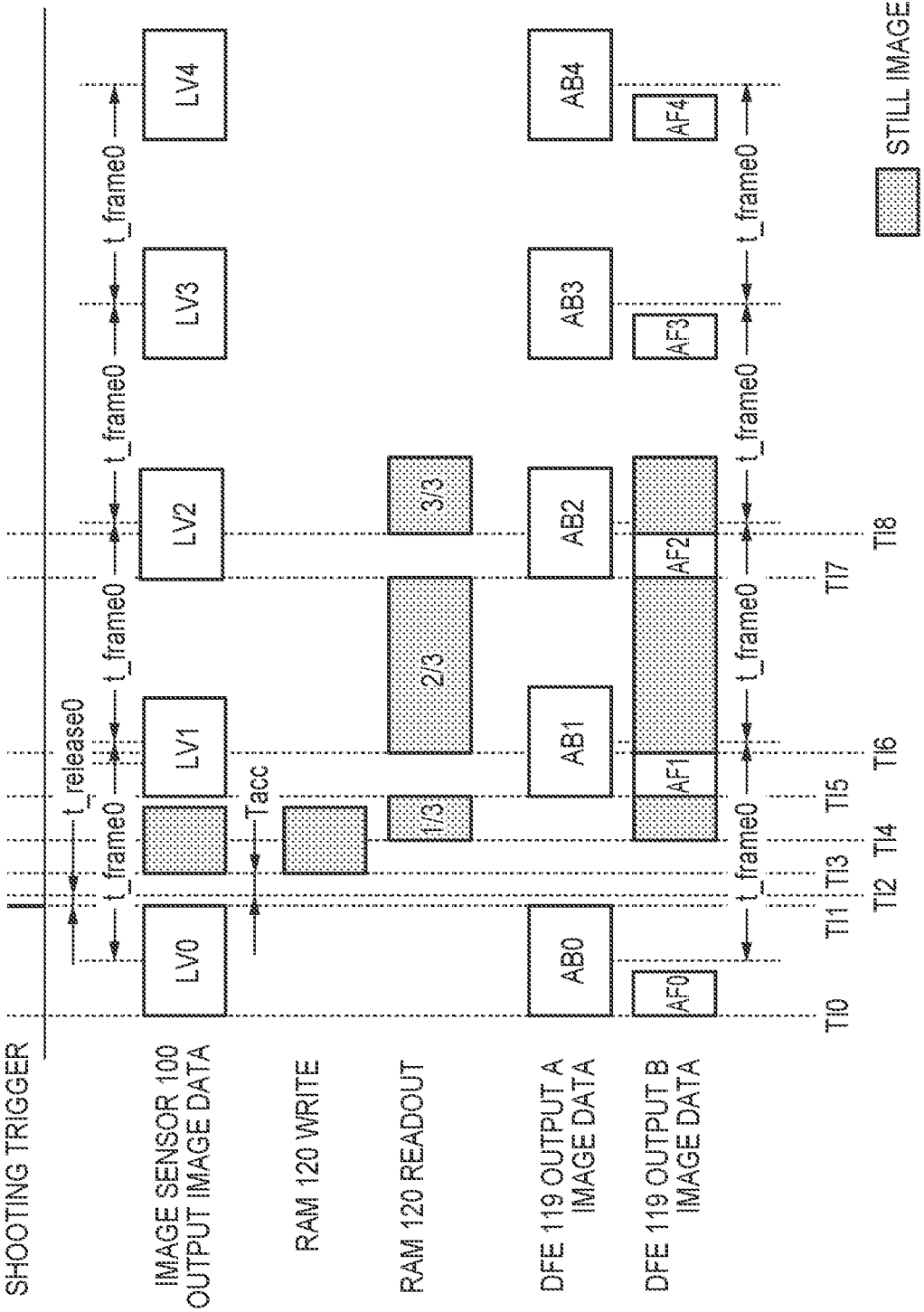
FIG. 17 is a timing chart pertaining to operations of the digital camera according to the third embodiment.

FIG. 17 is a timing chart pertaining to data transfer operations according to the present embodiment. As described above, in the moving image mode, the LV data, which includes the data of the A image, is read out in addition to the AB image (the image data) (the second readout mode). According to the present embodiment, of the LV data output from the image sensor 100, data AFx of the A image is input to the AF data compression circuit 309, and data ABx of the AB image is input directly to the data distribution circuit 308. Any desired method can be used to divide the LV data and input the data into the AF data compression circuit 309 and the data distribution circuit 308. For example, the timing at which to receive data can be specified for the AF data compression circuit 309 and the data distribution circuit 308 on the basis of the structure of the LV data read out by a data flow control circuit 307.

The data of the A image has its data mount reduced (compressed) by the AF data compression circuit 309 using a predetermined method, and is then input to the data distribution circuit 308. The data distribution circuit 308 then outputs the A image data input from the AF data compression circuit 309 to the data output circuit 306. The data output circuit 306 then outputs the A image data (AF data) to the CPU 101 as the output B from the DFE 119. On the other hand, the AB image included in the LV data is input directly to the data distribution circuit 308 from the RAM 120. The data distribution circuit 308 then outputs the image data of the AB image to the data output circuit 305. The data output circuit 305 then outputs the AB image data (image data) to the CPU 101 as the output A from the DFE 119 (TI0 in FIG. 17).

If, for example, the shooting of a still image based on a still image shooting instruction made at TI1 in FIG. 17 has been started from TI2, the readout period of the still image data written into the RAM 120 will overlap with the output period of the AF data. In this case, the data flow control circuit 307 suspends the readout of the still image data started from TI4 and the output from the data output circuit 306 at the timing of the AF data output (TI5), and switches the output of the data output circuit 306 to the AF data. The data flow control circuit 307 causes the RAM control circuit 300 to suspend the readout, and switches the setting of the data distribution circuit 308 so that the output of the AF data compression circuit 309, rather than the output of the RAM 120, is supplied to the data output circuit 306. Once the output of the AF data ends (TI6), the data flow control circuit 307 causes the readout of the still image data from the RAM 120 and the output from the data output circuit 306 to resume. The same control is carried out at time TI7 and TI8 as well.

In the present embodiment, the LV data is divided into AF data and image data, and is transferred to the CPU through separate output systems. The data amount is therefore reduced by an amount equivalent to the AF data, and thus the cycle for sending the image data used to display the live view image can be maintained even if the data rate of the output circuit is low. On the other hand, the still image data and the AF data are output using the same output system. At this time, the AF data can be output at a constant cycle by prioritizing the output of the AF data. The present embodiment is also useful for outputting moving image data having a resolution higher than the resolution of the display device 103 at a stable cycle.

Fourth Embodiment

Figure 18:
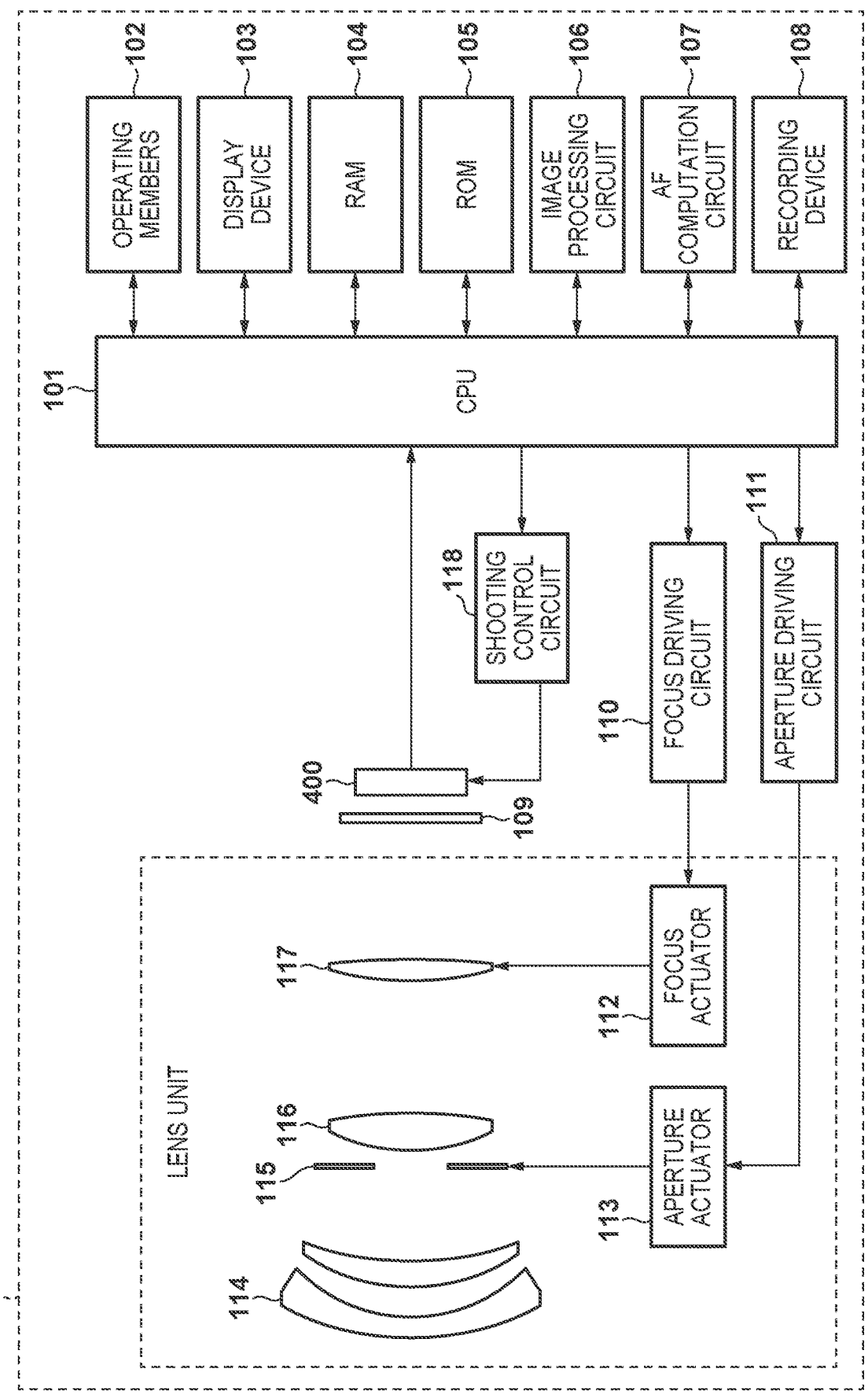
FIG. 18 is a block diagram illustrating an example of the functional configuration of a digital camera according to a fourth embodiment.

A fourth embodiment of the present invention will be described next. FIG. 18 is a block diagram illustrating an example of the functional configuration of a digital camera 2000 according to the present embodiment. Configurations that are the same as in FIG. 1 are given the same reference signs. In the present embodiment, an image sensor 400 has the functions of a DFE.

Figure 19A:
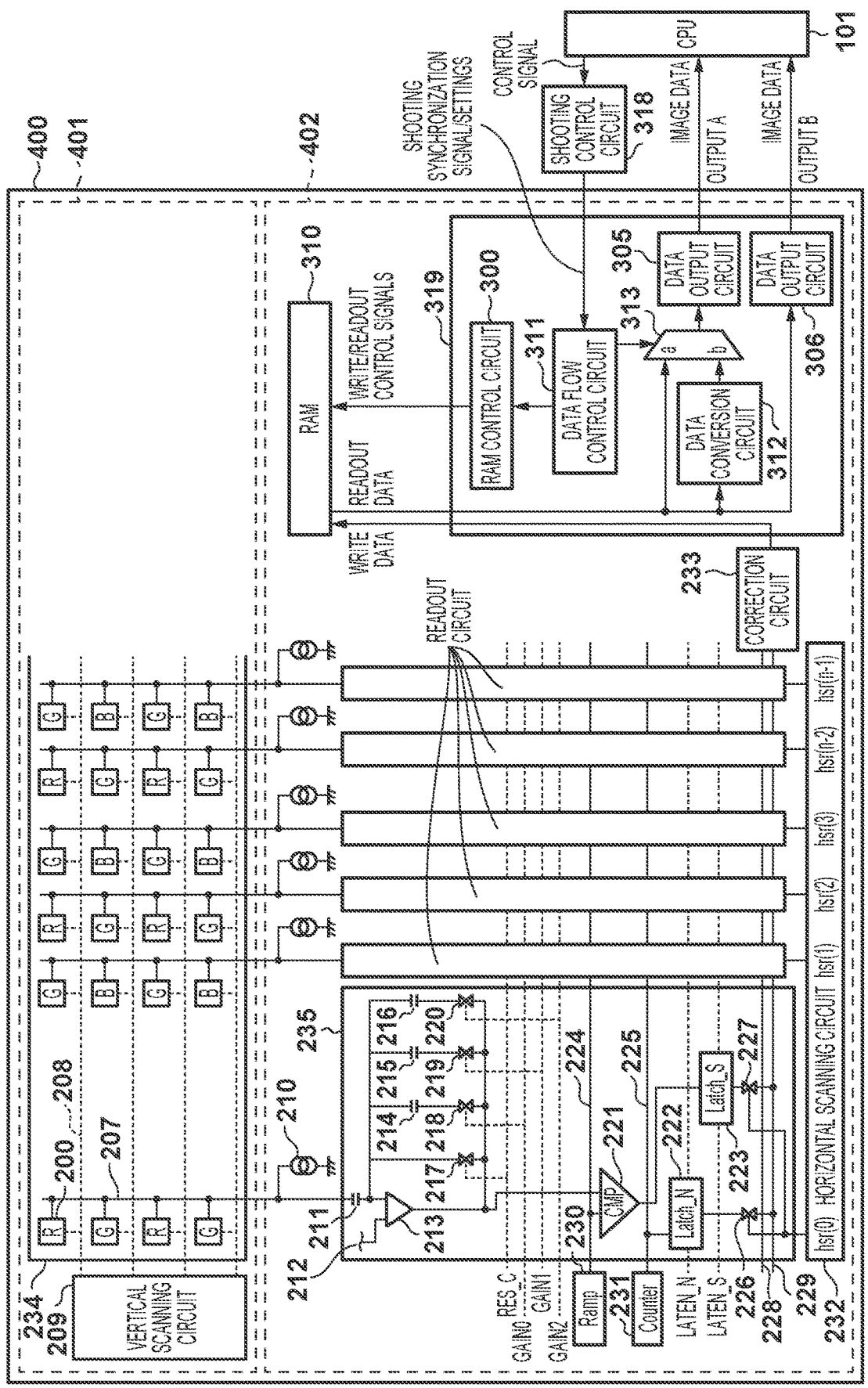
FIG. 19A is a diagram pertaining to the configuration of an image sensor according to the fourth embodiment.
Figure 19B:
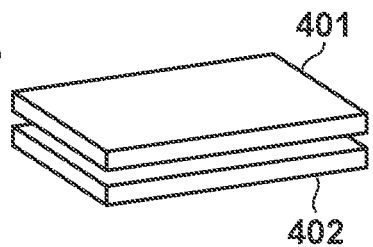
FIG. 19B is a diagram pertaining to the configuration of an image sensor according to the fourth embodiment.

FIG. 19A is a diagram illustrating an example of the configuration of the image sensor 400 according to the present embodiment. Configurations that are the same as those illustrated in FIGS. 3 and 12 are given the same reference signs, and descriptions thereof are omitted. As schematically illustrated in FIG. 19B, the image sensor 400 is configured as a semiconductor package having two semiconductor substrates 401 and 402, and in FIG. 19A, 401 and 402 indicate examples of regions where the respective semiconductor substrates are provided. In other words, the configuration is such that the DFE 119 and RAM 310 are contained in the same semiconductor package as the image sensor.

A data flow control circuit 311 controls the RAM control circuit 300 and a selector 313. A data conversion circuit 312 converts still image data read out from the RAM 310 into one frame of LV data through scaling, for example.

Figure 20A:
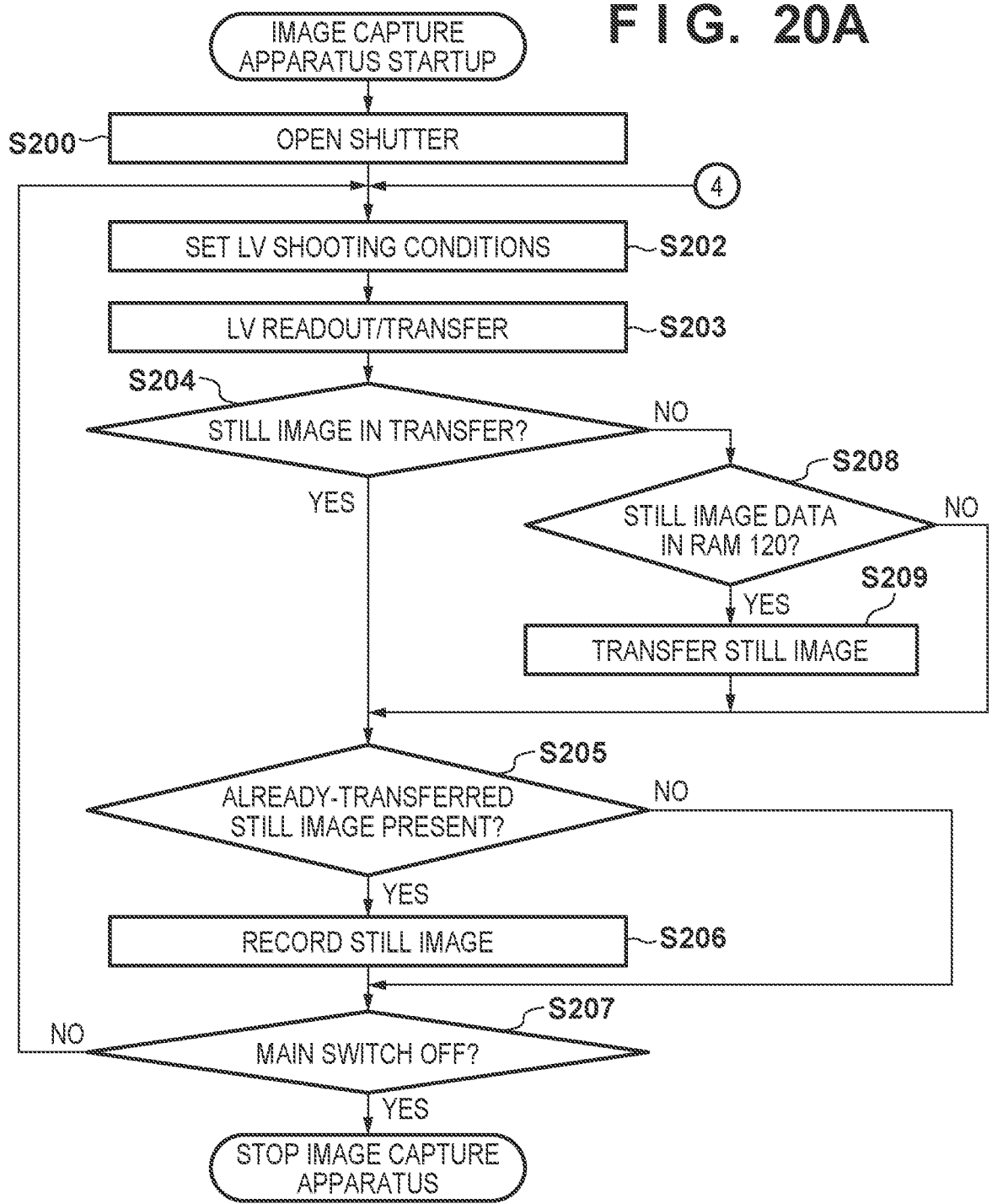
FIG. 20A is a flowchart pertaining to operations of the digital camera according to the fourth embodiment.
Figure 20B:
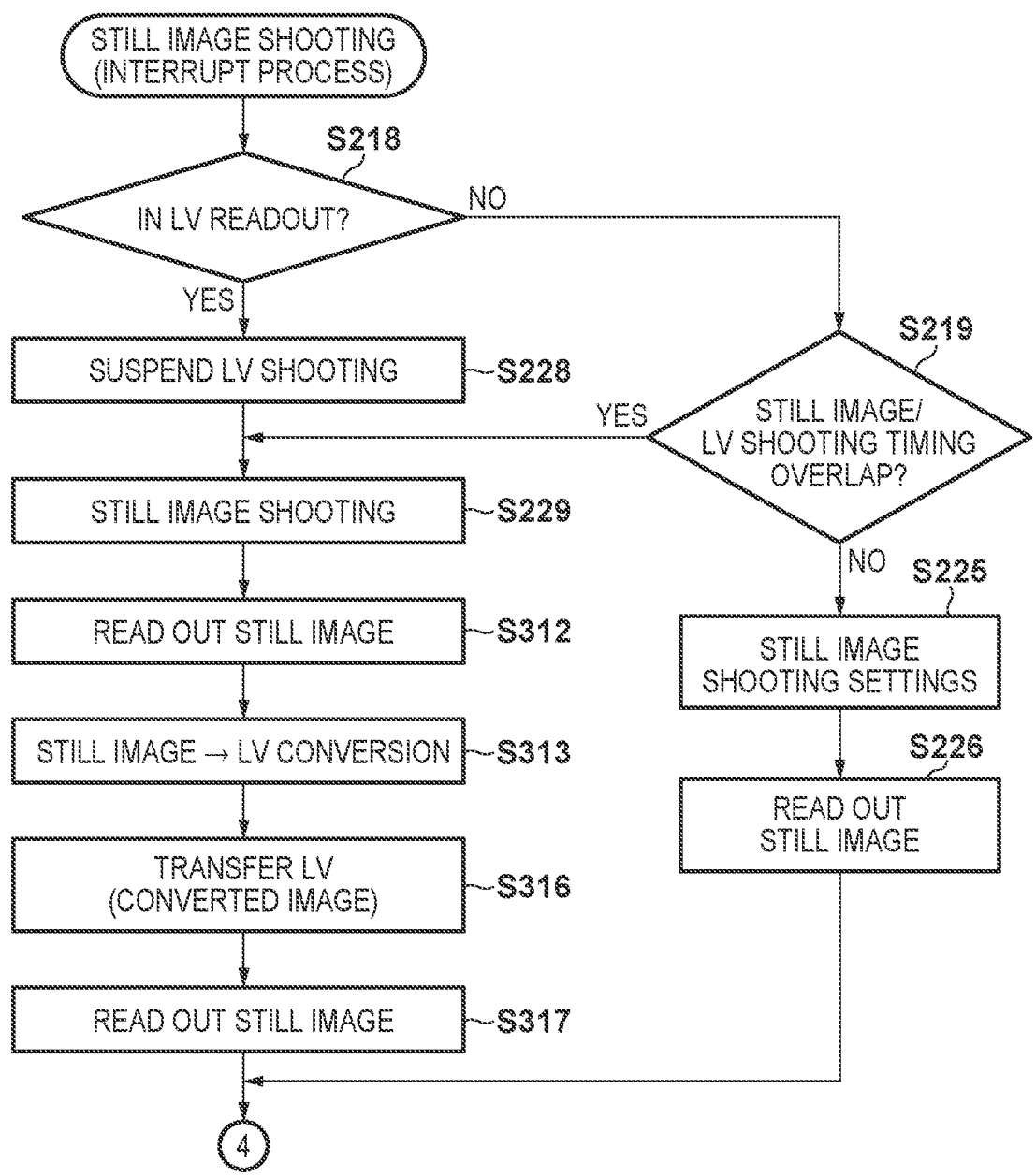
FIG. 20B is a flowchart pertaining to operations of the digital camera according to the fourth embodiment.
Figure 21A:
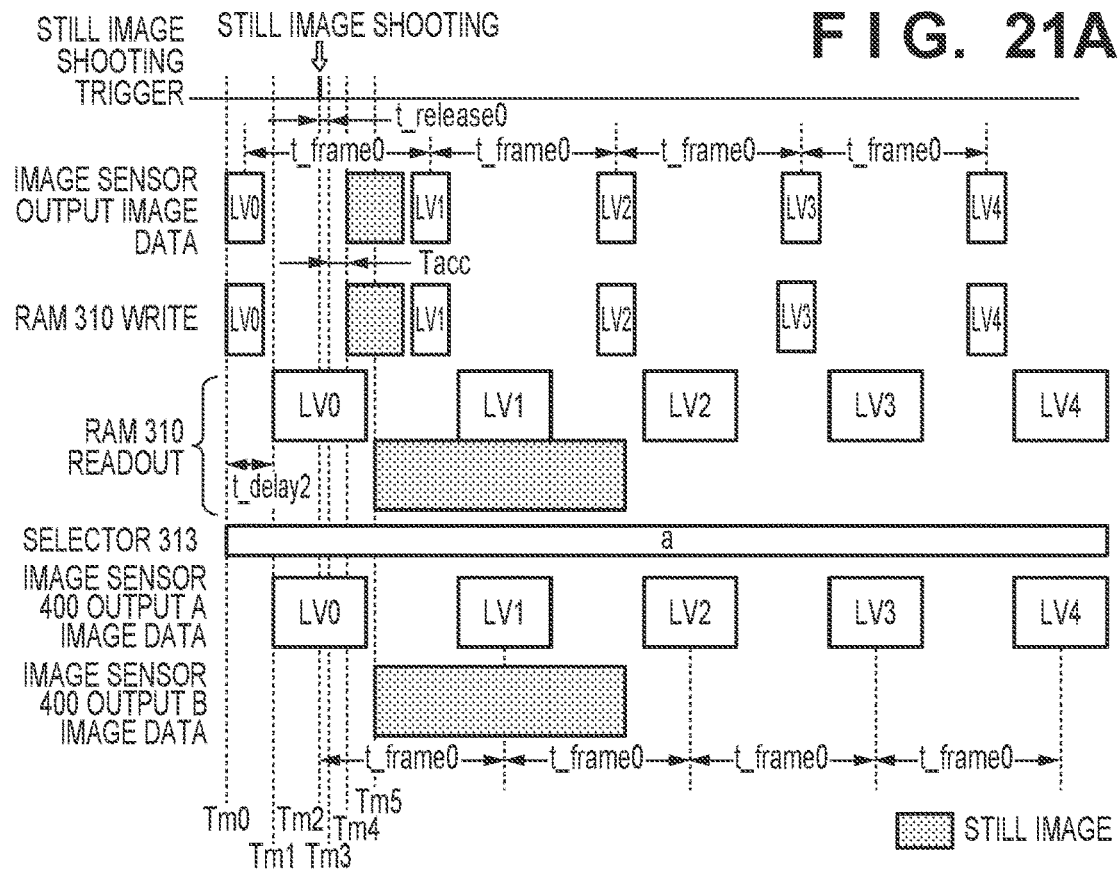
FIG. 21A is a timing chart pertaining to operations of the digital camera according to the fourth embodiment.

FIGS. 20A and 20B are flowcharts pertaining to operations of the digital camera 2000 according to the present embodiment. In FIGS. 20A and 20B, steps carrying out the same processes as those in FIGS. 13A, 13B-1, and 13B-2 will be given the same reference signs, and descriptions thereof will be omitted. FIG. 21A is a timing chart illustrating a case where a period in which the LV data is read out from the image sensor (the correction circuit 233) and a period in which the still image is read out do not overlap.

In the present embodiment, of the image data read out from the RAM 310, the LV data is input to one side of the selector 313 and the data conversion circuit 312. The still image data is input directly to the data output circuit 306. If the period in which the LV data is read out from the image sensor 100 does not overlap with the period in which the still image is read out, the readout of the LV data from the image sensor 100 is not suspended. Accordingly, the data flow control circuit 311 controls the selector 313 to output the LV data input directly to the input a from the RAM 310. It is assumed that time-division readout taking the output rates of the data output circuits 305 and 306 into account is carried out in a period in which both the LV data and the still image data are read out from the RAM 310.

Figure 21B:
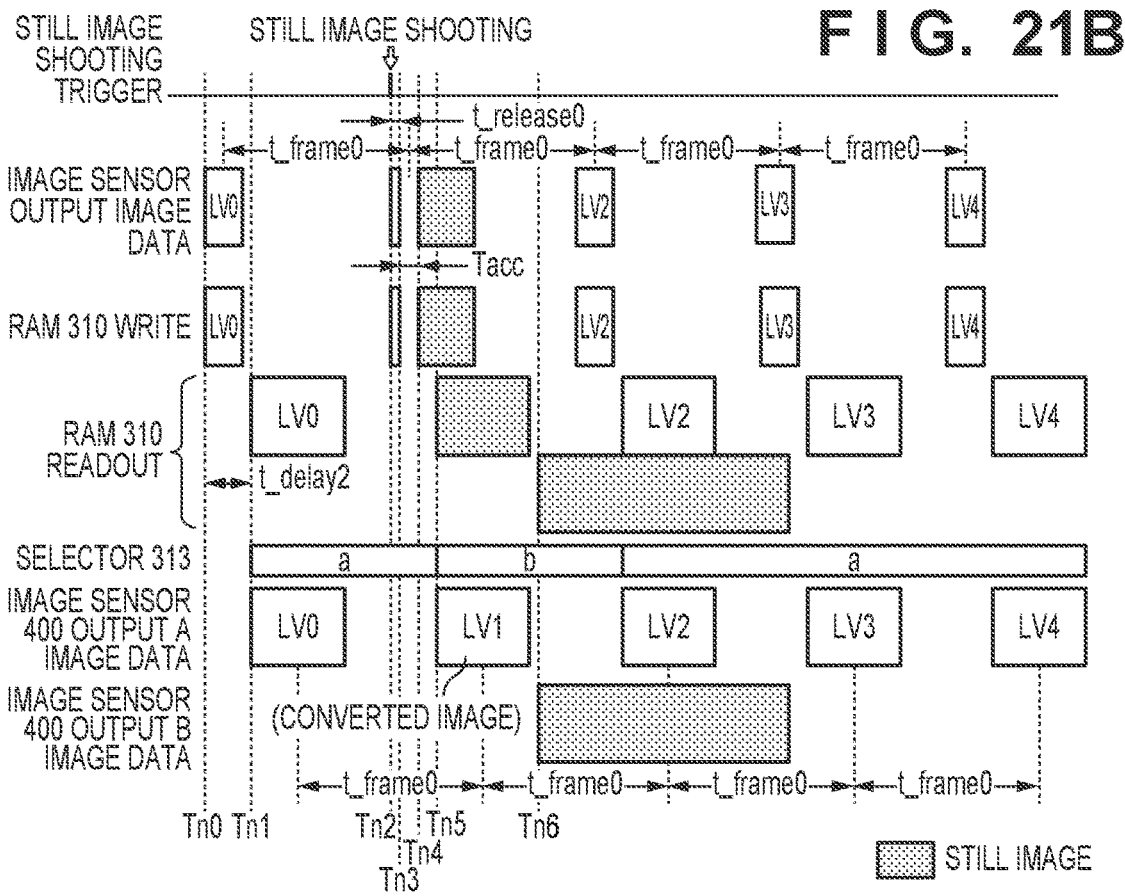
FIG. 21B is a timing chart pertaining to operations of the digital camera according to the fourth embodiment.

FIG. 21B is a timing chart illustrating a case where a period in which the LV data is read out from the image sensor and a period in which the still image is read out do not overlap. Operations from step S312 and on in FIG. 20B will be described next with reference to the timing chart in FIG. 21B.

In the present embodiment, still image shooting is prioritized, and when a still image shooting instruction is made during the readout of LV data (Tn2 in FIG. 21B), moving image shooting (the readout of the LV data) is stopped and the still image is shot (Tn3 in FIG. 21B). In this case, the still image data is read out from the RAM 310 at the timing of the LV data readout (Tn5 in FIG. 21B) rather than the LV data for which the readout was stopped (step S312).

In step S313, the data conversion circuit 312 generates the LV data from the read-out still image data. At time Tn5, the data flow control circuit 311 switches the selector 313 to output the LV data input to the input b from the data conversion circuit 312. As a result, the LV data generated from the still image data is output from the output A of the image sensor 400, and is used to display the live view.

Then, at time Tn6, the still image data is once again read out from the RAM 120 (step S317), and the still image data is output from the output B of the image sensor 400. This still image data is subjected to image processing by the image processing circuit 106, and is recorded into the recording device 108 as a still image data file.

According to the present embodiment, the DFE 119 is built into the image sensor, which is useful for reducing the size of the apparatus. Furthermore, prioritizing the shooting of the still image over the transfer of the LV data makes it possible to shoot a still image while shooting a moving image, with little time lag. Further still, LV data lost due to the still image being shot is generated from the still image that has been shot, which makes it possible to prevent the LV display from dropping out, the interval being updated, and the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-115424, filed on Jun. 18, 2018, which is hereby incorporated by reference herein in its entirety.

The invention claimed is:

1. An image capture apparatus comprising:
photoelectric conversion elements each of which generates electric charges in accordance with the amount of received light;
a readout circuit that reads out image data for a still image and image data for a moving image, both image data are based on charges generated by the photoelectric conversion elements;
an output circuit that outputs the image data for a still image or the image data for a moving image read out by the readout circuit;
a convertor that converts the image data for a still image read out by the readout circuit into image data for a moving image; and
a controller that, in a case where a still image shooting instruction has been made while the readout circuit is reading out image data for a moving image, controls the readout circuit to stop reading out the image data for a moving image, and controls the output circuit to first output, as an alternative of the image data for a moving image of which read out is stopped, image data for a moving image converted from the image data for a still image by the convertor; and then output image data for a still image read out by the readout circuit.

2. The image capture apparatus according to claim 1, wherein the image data for a moving image data that is converted from the image data for a still image by the convertor is output from the second output circuit as moving image data of one frame of a moving image for display.

3. The image capture apparatus according to claim 1, further comprising a memory that stores the image data for a still image read out by the readout circuit, and
wherein the convertor converts the image data for a still image read out from the memory into the image data for a moving image.

4. A method performed by an image capture apparatus that comprises photoelectric conversion elements each of which generates electric charges in accordance with the amount of received light, the method comprising:
reading out image data for a still image and image data for a moving image, both image data are based on charges generated by the photoelectric conversion elements;
converting the image data for a still image read out into image data for a moving image;
in a case where a still image shooting instruction has been made while image data for a moving image is being read out,
stopping the read out of the image data for a moving image; and outputting, as an alternative of the image data for a moving image of which read out is stopped, image data for a moving image converted from the image data for a still image, and then outputting image data for a still image.

\* \* \* \* \*